United States Patent
Kim et al.

(10) Patent No.: US 8,437,789 B2
(45) Date of Patent: May 7, 2013

(54) APPARATUS AND METHOD FOR COOPERATIVE TRANSMISSION/RECEPTION IN WIRELESS COMMUNICATION SYSTEM

(75) Inventors: Yong-Seok Kim, Incheon (KR); Keun-Chul Hwang, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 400 days.

(21) Appl. No.: 12/902,580

(22) Filed: Oct. 12, 2010

(65) Prior Publication Data
US 2011/0098072 A1    Apr. 28, 2011

(30) Foreign Application Priority Data
Oct. 22, 2009 (KR) .................... 10-2009-0100622

(51) Int. Cl.
*H04B 7/00* (2006.01)
(52) U.S. Cl.
USPC ........ 455/509; 455/450; 455/436; 455/422.1; 455/464
(58) Field of Classification Search .......... 455/509, 455/7, 507, 450, 422.1, 456.1, 524, 513, 455/525, 404.1, 452.1, 424, 426, 464, 436; 370/343, 345, 329, 328, 335, 252, 315, 331; 375/295, 260
See application file for complete search history.

(56) References Cited

U.S. PATENT DOCUMENTS

| | | | |
|---|---|---|---|
| 2001/0046220 A1* | 11/2001 | Koo et al. | 370/335 |
| 2007/0218915 A1* | 9/2007 | Yang et al. | 455/450 |
| 2008/0192686 A1* | 8/2008 | Cho et al. | 370/329 |
| 2009/0135778 A1* | 5/2009 | Lee et al. | 370/329 |
| 2009/0175214 A1* | 7/2009 | Sfar et al. | 370/315 |
| 2009/0199063 A1* | 8/2009 | Chun et al. | 714/749 |
| 2010/0027487 A1* | 2/2010 | Ihm et al. | 370/329 |
| 2010/0091680 A1* | 4/2010 | Chun et al. | 370/252 |
| 2010/0195527 A1* | 8/2010 | Gorokhov et al. | 370/252 |
| 2011/0070907 A1* | 3/2011 | Chou | 455/507 |
| 2011/0149942 A1* | 6/2011 | Ko et al. | 370/343 |
| 2011/0164587 A1* | 7/2011 | Seo | 370/329 |
| 2011/0218010 A1* | 9/2011 | Hoymann et al. | 455/513 |

* cited by examiner

*Primary Examiner* — Tan Trinh
(74) *Attorney, Agent, or Firm* — Jefferson IP Law, LLP

(57) ABSTRACT

For cooperative transmission in a broadband wireless communication system, an apparatus and operating method of a Base Station (BS) in a broadband wireless communication system are provided. The method includes receiving a cooperative transmission REQuest (REQ) message which includes at least one of information designating a cooperative Mobile Station (MS), a pilot pattern of the cooperative MS, a variable determining a permutation pattern, and an orthogonal code of the cooperative MS, from a control station, allocating a resource of a predefined Coordinated MultiPoint transmit/receive (CoMP) zone occupying part of a frame, to at least one cooperative MS designated by the cooperative transmission REQ message, and communicating with the at least one cooperative MS according a cooperative transmission scheme using the resource of the CoMP zone.

28 Claims, 17 Drawing Sheets

BS A | A1 | A2 | A3 | A4 | A5 | A6 | A7 | A8 | A9 | A10 | A11 | A12 |

BS B | B1 | B2 | B3 | B4 | B5 | B6 | B7 | B8 | B9 | B10 | B11 | B12 |

PERMUTATION
(PERMBASE=X)

APPARATUS AND METHOD FOR COOPERATIVE TRANSMISSION/RECEPTION IN WIRELESS COMMUNICATION SYSTEM

PRIORITY

This application claims the benefit under 35 U.S.C. §119(a) to a Korean patent application filed in the Korean Intellectual Property Office on Oct. 22, 2009, and assigned Serial No. 10-2009-0100622, the entire disclosure of which is hereby incorporated by reference.

BACKGROUND OF THE INVENTION

1. Field of the Invention

The present invention relates to a broadband wireless communication system. More particularly, the present invention relates to an apparatus and a method for cooperative transmission/reception in a broadband wireless communication system.

2. Description of the Related Art

A Multi-User (MU) Multiple Input Multiple Output (MIMO) technique enables a plurality of users to share the same time-frequency resource and to transmit and receive signals over a plurality of antennas at the same time. Currently, communication system standards such as the Institute of Electrical and Electronics Engineers (IEEE) 802.16 standard and the 3rd Generation Partnership Project (3GPP) Long Term Evolution (LTE) standard define specifications to support the MU MIMO technique. However, even when the MU MIMO is supported, interference still occurs in an overlapping area between cells or sectors of a base station and this interference degrades the performance. To address the interference, a scheme for two or more base station to cooperatively transmit and receive signals at the same time to and from a mobile station traveling in the edge of the cell or the sector is suggested, which is referred to as a cooperative transmission scheme.

As discussed above, the cooperative transmission scheme can mitigate the interference of the mobile stations traveling in the edge of the cell or the sector and enhance the system throughput. However, there is no specific method suggested for the cooperative transmission.

SUMMARY OF THE INVENTION

An aspect of the present invention is to address at least the above-mentioned problems and/or disadvantages and to provide at least the advantages described below. Accordingly, an aspect of the present invention is to provide an apparatus and a method for cooperative transmission in a broadband wireless communication system.

Another aspect of the present invention is to provide an apparatus and a method for cooperative transmission using resource at a preset location in a broadband wireless communication system.

Yet another aspect of the present invention is to provide an apparatus and a method for determining a cooperative mobile station and a cooperative base station for cooperative transmission in a broadband wireless communication system.

Still another aspect of the present invention is to provide an apparatus and a method for determining a cooperative group using handover related information of a mobile station in a broadband wireless communication system.

A further aspect of the present invention is to provide an apparatus and a method for determining a cooperative group using channel quality information in a broadband wireless communication system.

According to an aspect of the present invention, an operating method of a Base Station (BS) in a broadband wireless communication system is provided. The method includes receiving a cooperative transmission REQuest (REQ) message that includes at least one of information designating a cooperative Mobile Station (MS), a pilot pattern of the cooperative MS, a variable determining a permutation pattern, and an orthogonal code of the cooperative MS, from a control station, allocating a resource of a predefined Coordinated MultiPoint transmit/receive (CoMP) zone occupying part of a frame, to at least one cooperative MS designated by the cooperative transmission REQ message, and communicating with the at least one cooperative MS according a cooperative transmission scheme using the resource of the CoMP zone.

According to another aspect of the present invention, an operating method of a control station for controlling a cooperative transmission in a broadband wireless communication system is provided. The method includes determining cooperative BSs and at least one cooperative MS for the cooperative transmission using handover related information of an MS received from a BS or per BS channel quality information of the MS, determining at least one of a pilot pattern of a cooperative MS, a variable determining a permutation pattern, and an orthogonal code of the cooperative MS, as a setup variable for the cooperative transmission, and transmitting a cooperative transmission REQuest (REQ) message including at least one of information designating the cooperative MS, the pilot pattern of the cooperative MS, the variable determining the permutation pattern, and the orthogonal code of the cooperative MS, to the cooperative BSs.

According to yet another aspect of the present invention, an operating method of an MS in a broadband wireless communication system is provided. The method includes when receiving a normal MAP message, communicating with a serving BS, and when receiving a MAP message for a cooperative transmission, the message including at least one of a pilot pattern of a cooperative MS, a variable determining a permutation pattern, and an orthogonal code of the cooperative MS, communicating with cooperative BSs according to a cooperative transmission scheme using resources in a predefined CoMP zone occupying part of a frame.

According to still another aspect of the present invention, an apparatus of a BS in a broadband wireless communication system is provided. The apparatus includes a communicator for receiving a cooperative transmission REQ message that includes at least one of information designating a cooperative MS, a pilot pattern of the cooperative MS, a variable determining a permutation pattern, and an orthogonal code of the cooperative MS, from a control station, a controller for allocating a resource of a predefined CoMP zone occupying part of a frame, to at least one cooperative MS designated by the cooperative transmission REQ message, and for controlling to communicate with the at least one cooperative MS according a cooperative transmission scheme using the resource of the CoMP zone, a permutation processor for permutating a transmit signal of the CoMP zone according to a permutation rule defined by the variable determining the permutation pattern, and a de-permutation processor for de-permutating a receive signal of the CoMP zone according to the permutation rule defined by the variable determining the permutation pattern.

According to a further aspect of the present invention, an apparatus of a control station for controlling a cooperative transmission in a broadband wireless communication system is provided. The apparatus includes a determiner for determining cooperative BSs and at least one cooperative MS for the cooperative transmission using handover related information of an MS received from a BS or per BS channel quality information of the MS, a manager for determining at least one of a pilot pattern of a cooperative MS, a variable determining a permutation pattern, and an orthogonal code of the cooperative MS, as a setup variable for the cooperative transmission, and a communicator for transmitting a cooperative transmission REQ message including at least one of information designating the cooperative MS, the pilot pattern of the cooperative MS, the variable determining the permutation pattern, and the orthogonal code of the cooperative MS, to the cooperative BSs.

According to a further aspect of the present invention, an apparatus of an MS in a broadband wireless communication system is provided. The apparatus includes a controller for communicating with a serving BS when receiving a normal MAP message, and when receiving a MAP message for a cooperative transmission, the message including at least one of a pilot pattern of a cooperative MS, a variable determining a permutation pattern, and an orthogonal code of the cooperative MS, controlling to communicate with cooperative BSs according to a cooperative transmission scheme using resources in a predefined CoMP zone occupying part of a frame, a permutation processor for permutating a transmit signal of the CoMP zone according to a permutation rule defined by the variable determining the permutation pattern, and a de-permutation processor for de-permutating a receive signal of the CoMP zone according to the permutation rule defined by the variable determining the permutation pattern.

The above and other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 2 illustrates permutation of a Coordinated MultiPoint transmit/receive (CoMP) zone and a non-CoMP zone divided by Time Division Multiplexing (TDM) in a broadband wireless communication system according to an exemplary embodiment of the present invention;

Throughout the drawings, it should be noted that like reference numerals to depict the same or similar elements, features, and structures.

DETAILED DESCRIPTION OF EXEMPLARY EMBODIMENTS

Figure 1A:
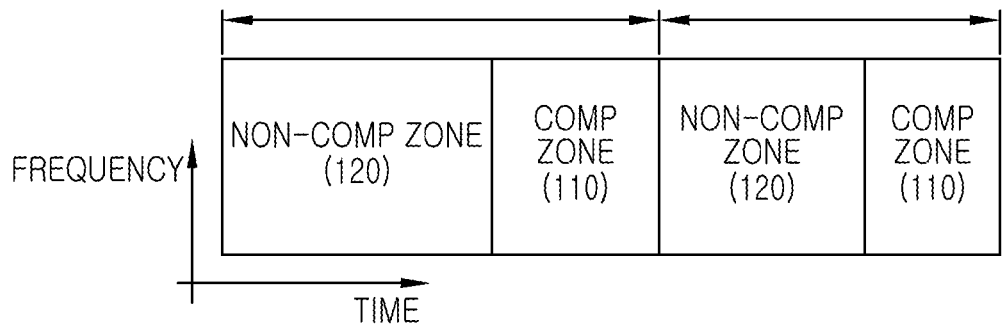
FIGS. 1A-1C illustrate a frame structure in a broadband wireless communication system according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention are provided for purposes of illustration only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Exemplary embodiments of the present invention provide a technique for cooperative transmission in a broadband wireless communication system. Herein, the cooperative transmission includes both downlink communication and uplink communication. While an Orthogonal Frequency Division Multiplexing (OFDM)/Orthogonal Frequency Division Multiple Access (OFDMA) wireless communication system is exemplified, the present invention is equally applicable to other wireless communication systems.

Hereinafter, the cooperative transmission indicates a communication scheme for two or more Base Stations (BSs) to cooperatively transmit and receive signals to and from at least one Mobile Station (MS) traveling in an edge of a cell or a sector at the same time, a cooperative MS represents an MS participating in the cooperative transmission, a cooperative BS represents a BS participating in the cooperative transmission, and a cooperative group represents a set of at least one cooperative MS and at least one cooperative BS participating in the corresponding cooperative transmission. A normal MS represents an MS not participating in the cooperative transmission.

For the cooperative transmission, the system must support a plurality of BSs in the concurrent use of the same time-frequency-space (antenna) resource. Hence, the cooperative transmission requires a frame structure as described below.

Figure 1B:
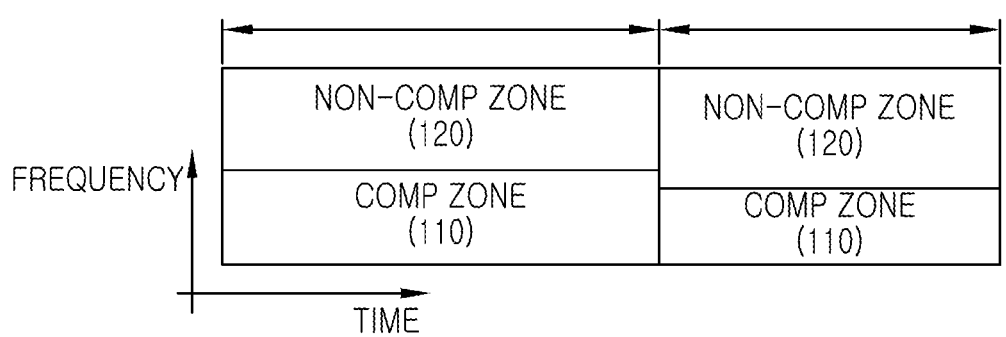
Figure 1C:
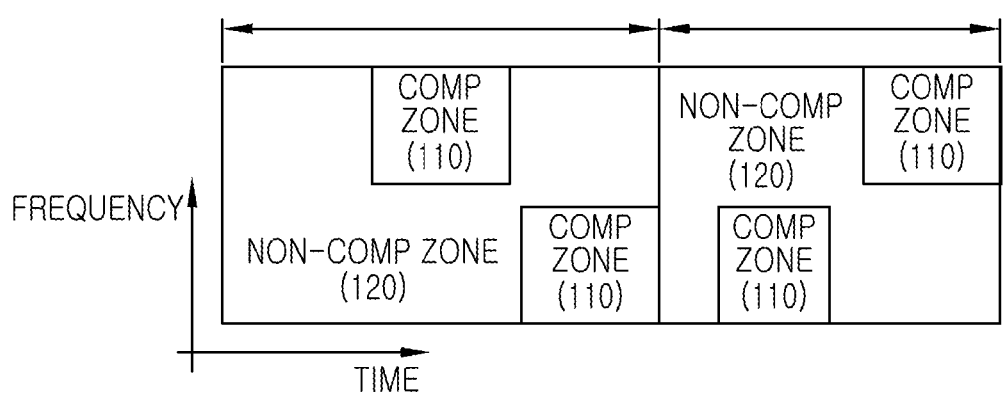

FIGS. 1A-1C illustrate a frame structure in a broadband wireless communication system according to an exemplary embodiment of the present invention.

Referring to FIGS. 1A-1C, the frame includes a dedicated resource region for the cooperative transmission. Hereafter, the dedicated resource region for the cooperative transmission is referred to as a Coordinated MultiPoint (CoMP) transmit/receive zone. According to the division of the CoMP zone, the frame structure of FIGS. 1A, 1B, and 1C can be applied. FIG. 1A divides the CoMP zone 110 and a non-CoMP zone 120 based on Time Division Multiplexing (TDM), and FIG. 1B divides the CoMP zone 110 and the non-CoMP zone 120 based on Frequency Division Multiplexing (FDM). FIG. 1C distributes the CoMP zone 110 to particular spots of the frame. Although it is not depicted in FIGS. 1A-1C, exemplary embodiments of the present invention can adopt a structure that is divided based on the TDM in a downlink interval and based on the FDM in an uplink interval, or the structure that is divided based on the FDM in the downlink interval and based on the TDM in the uplink interval.

For the cooperative transmission, it is necessary to limit not only the location of the CoMP zone but also a signal type transmitted over the CoMP zone. For example, a permutation pattern needs to be limited.

Even with the CoMP zone of the same location in the time-frequency domains between the BSs, when the permutation patterns of the BSs differ from each other, the cooperative transmission is infeasible. At the least, the cooperative BSs should use the same permutation pattern for signals transmitted and received in the CoMP zone. The cooperative BSs can use the same permutation pattern by setting a particular variable that determines the permutation pattern, to the same value. For example, an uplink tile permutation pattern of an Institute of Electrical and Electronics Engineers (IEEE) 802.16e system is defined as Equation (1).

$$\text{Tile}(s,n) = N_{sch} \cdot n + (Pt[(s+n) \bmod N_{sch}] + ULPerBase) \bmod N_{sch} \quad (1)$$

In Equation (1), Tile(s,n) denotes an n-th tile of an s-th subchannel, $N_{sch}$ denotes the number of subchannels, s denotes an index of the subchannel, n denotes an index of the tile, and ULPermBase denotes a variable determining the permutation pattern.

The permutation pattern of Equation (1) is determined by the variable ULPermBase. That is, the change of the variable ULPermBase varies the permutation pattern between the BSs. Accordingly, in the IEEE 802.16 system, the cooperative BSs can attain the same tile permutation pattern by setting the same value of ULPermBase. In this exemplary embodiment, the system maintains randomness of the value ULPermBase for the non-CoMP zone and matches the value ULPermBase for the CoMP zone. Other standard systems than the IEEE 802.16e can match the permutation pattern by matching the particular variable, such as ULPermBase, which determines the permutation pattern.

FIG. 2 illustrates permutation of a CoMP zone and a non-CoMP zone divided based on TDM in a broadband wireless communication system according to an exemplary embodiment of the present invention.

Referring to FIG. 2, when the variable PermBase is defined as the same X, the tiles permutated by the BS A and the BS B have the identical pattern.

Figure 3:
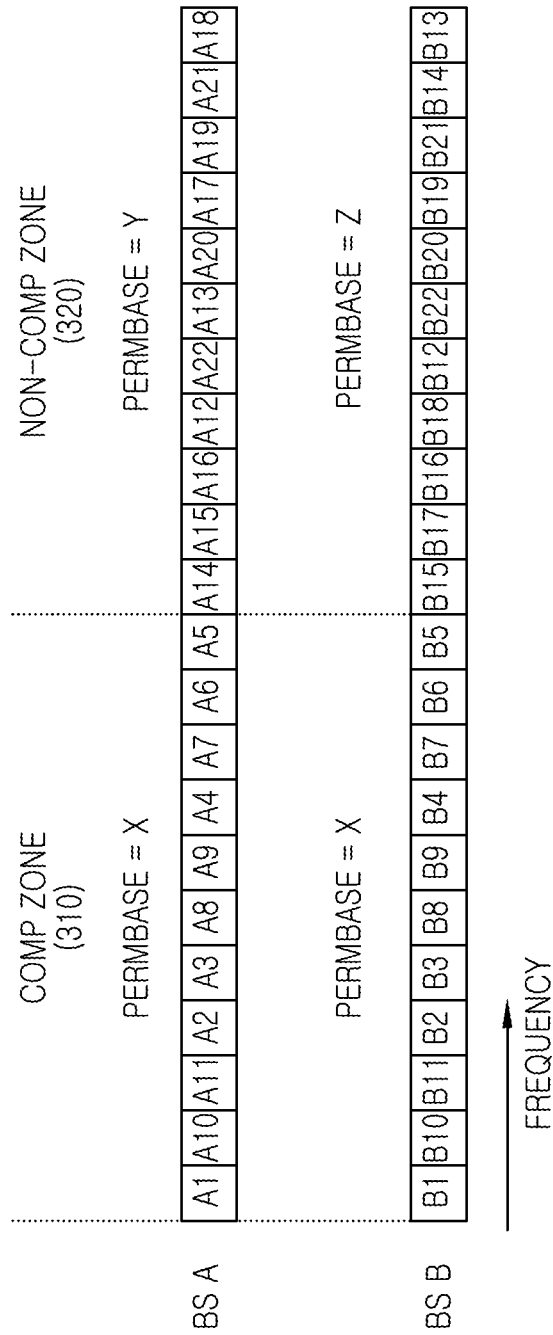
FIG. 3 illustrates permutation of a CoMP zone and a non-CoMP zone divided by Frequency Division Multiplexing (FDM) in a broadband wireless communication system according to an exemplary embodiment of the present invention.

FIG. 3 illustrates permutation of a CoMP zone and a non-CoMP zone divided based on FDM in a broadband wireless communication system according to an exemplary embodiment of the present invention.

Referring to FIG. 3, when the CoMP zone and the non-CoMP zone are divided based on the FDM scheme, the same value of PermBase is applied to bands belonging to the CoMP zone 310, and different values of PermBase are applied to bands of the non-CoMP zone 320. Thus, within the CoMP zone 310, the tiles permutated by the BS A and the BS B have the identical pattern.

For the cooperative transmission, the BSs must distinguish MSs in the CoMP zone.

According to a first approach for distinguishing the MSs, the system makes use of an orthogonal pilot pattern. Since information relating to the MSs participating in the cooperative transmission over the CoMP zone is shared among the cooperative BSs, the cooperative BSs can allocate orthogonal pilot patterns to the MSs. For example, when the tile includes four pilot symbols and four MSs take part in the cooperative transmission, the allocation of the pilot pattern is illustrated in FIG. 4.

Figure 4:
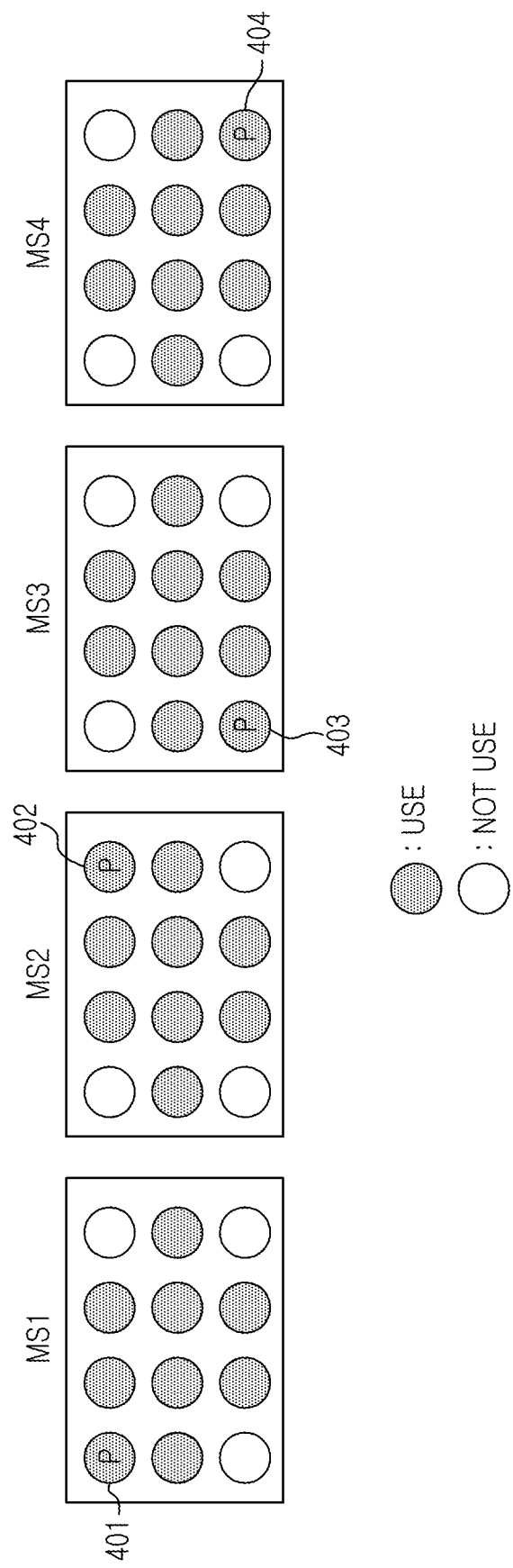
FIG. 4 illustrates allocation examples of a pilot pattern in a broadband wireless communication system according to an exemplary embodiment of the present invention.

FIG. 4 illustrates allocation examples of a pilot pattern in a broadband wireless communication system according to an exemplary embodiment of the present invention.

Referring to FIG. 4, the tiles are transmitted by the MSs respectively, and each MS transmits the pilot symbol using only one of four pilot tones 401, 402, 403, and 404 in the tile. Hence, based on the location of the pilot tone, the cooperative BSs can distinguish which cooperative MS transmits the pilot symbol.

According to a second exemplary approach for distinguishing the MSs, the system makes use of the orthogonal code. The approach using the orthogonal pilot patterns of FIG. 4 is inapplicable when the number of the pilot tones in the tile is smaller than the number of the cooperative MSs.

The orthogonal pilot patterns are restricted by the number of the pilot tones. In this situation, when the orthogonal codes are allocated to the cooperative MSs, the cooperative BSs can distinguish the signals of the cooperative MSs based on the orthogonal codes.

The signals transmitted and received through the cooperative transmission are expressed as follows.

In case of the uplink cooperative transmission with two cooperative BSs and four cooperative MSs, the channel is given by Equation (2).

$$H_{CoMP} = \begin{pmatrix} H_{A1} & H_{A2} & H_{A3} & H_{A4} \\ H_{B1} & H_{B2} & H_{B3} & H_{B4} \end{pmatrix} \quad (2)$$

In Equation (2), $H_{CoMP}$ denotes a channel (hereafter, referred to as a cooperative channel) between the cooperative BSs and the cooperative MSs, and $H_{XY}$ denotes a channel between the cooperative BS X and the cooperative MS Y.

The receive signal of each cooperative BS is given by Equation (3).

$$Y_A = H_{CoMP} \cdot \begin{pmatrix} x_1 \\ x_2 \\ x_3 \\ x_4 \end{pmatrix} + n \quad (3)$$

$$Y_B = H_{CoMP} \cdot \begin{pmatrix} x_1 \\ x_2 \\ x_3 \\ x_4 \end{pmatrix} + n$$

In Equation (3), $Y_X$ denotes the receive signal to the cooperative BS X, $H_{CoMP}$ denotes the cooperative channel, $x_Y$ denotes a transmit signal of the cooperative MS Y, and n denotes noise.

The cooperative BSs detect transmit signals of the cooperative MSs using the cooperative channel. When the magnitude of the cooperative channel is large, computational complexity increases based on the generation of a transmit/receive weight matrix. The corresponding receiver can use a quasi cooperative channel $\overline{H}_{CoMP}$ including only some channels of good channel status. For example, the cooperative BS A can use the cooperative channel including channels of the cooperative MS1 and the cooperative MS2, and the cooperative BS B can use the cooperative channel including channels of the cooperative MS3 and the cooperative MS4. In this case, the receive signal to the cooperative BS is given by Equation (4).

$$Y_A = \overline{H}_{CoMP} \cdot \begin{pmatrix} x_1 \\ x_2 \end{pmatrix} + n \quad (4)$$

$$Y_B = \overline{H}_{CoMP} \cdot \begin{pmatrix} x_3 \\ x_4 \end{pmatrix} + n$$

In Equation (4), $Y_X$ denotes the receive signal to the cooperative BS X, $\overline{H}_{CoMP}$ denotes the quasi cooperative channel, $x_Y$ denotes the transmit the signal of the cooperative MS Y, and n denotes noise.

For the cooperative transmission, it is necessary to determine cooperative BSs and cooperative MSs to participate in the cooperative transmission. Exemplary embodiments of the present invention provide a method using handover related information or Channel Quality Information (CQI) determined by the MS.

The handover related information is used to start or end the cooperative transmission, which is now described.

Figure 5:
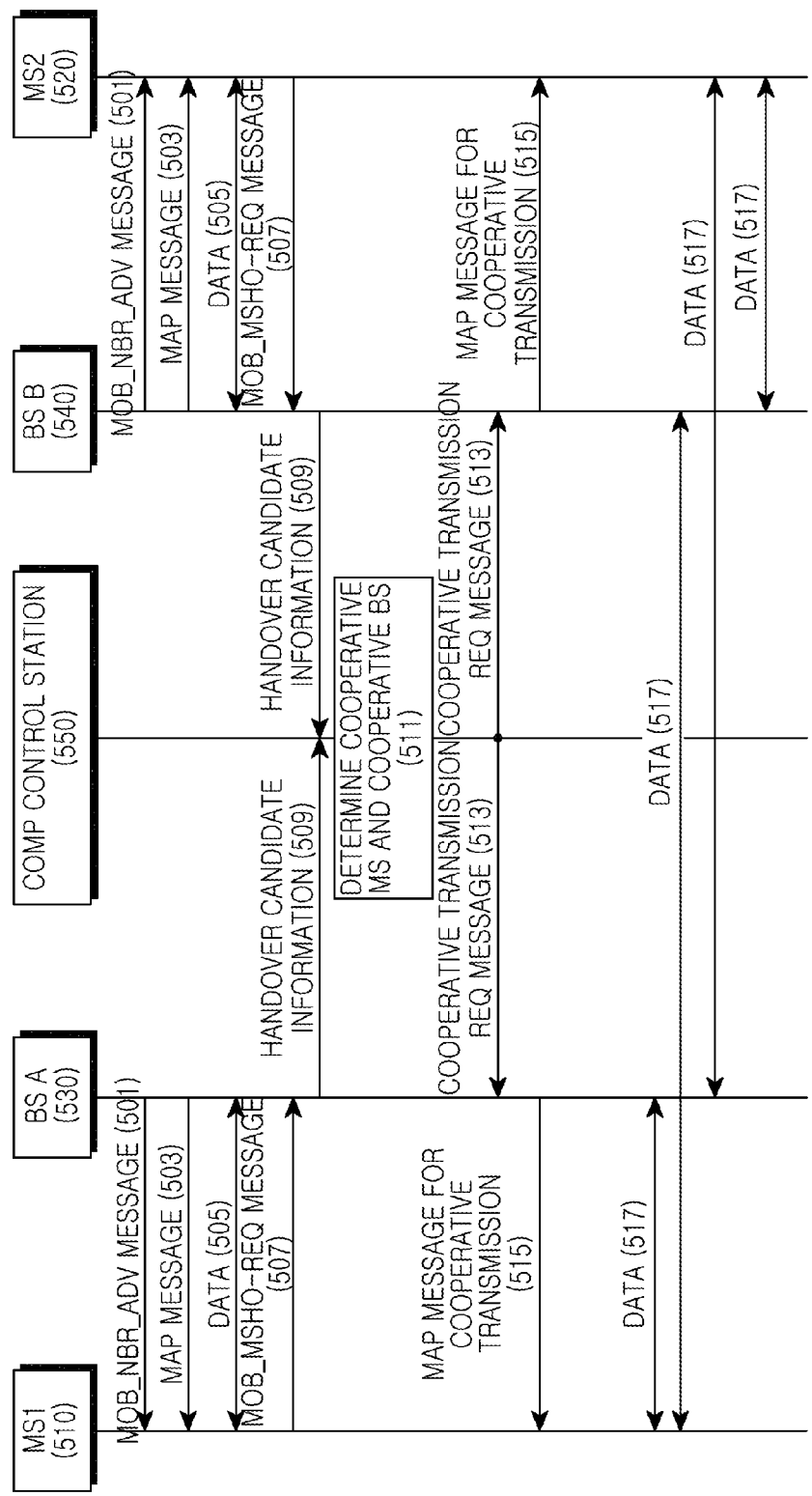
FIG. 5 illustrates signal exchanges for initiating cooperative transmission using handover related information in a broadband wireless communication system according to an exemplary embodiment of the present invention.

FIG. 5 illustrates signal exchanges for initiating cooperative transmission using handover related information in a broadband wireless communication system according to an exemplary embodiment of the present invention.

Referring to FIG. 5, a cooperative transmission involves an MS1 510, an MS2 520, a BS A 530, and a BS B 540. A CoMP control station 550 controls the cooperative transmission. The CoMP control station 550 can be one of the cooperative BSs, or an upper node of the BSs. The MS1 510 accesses the BS A 530 and the MS2 520 accesses the BS B 540.

In step 501, the MS1 510 and the MS2 520 receive a MOBile NeighBoR ADVertisement (MOB_NBR_ADV) message including information of neighbor BSs, from their respective serving BS. In step 503, the MS1 510 receives a MAP message from the BS A 530 and the MS2 520 receives a MAP message from the BS B 540. In step 505, the MS1 510 and the MS2 520 perform normal communication.

The MS1 510 and the MS2 520 select BSs having channel quality greater than a threshold among the neighbor BSs identified from the MOB_NBR_ADV message, and determine the selected BSs as handover candidates. The MS1 510 and the MS2 520 transmit a MOBile Mobile Station HandOver REQuest (MOB_MSHO-REQ) message including the candidates and the CQI of the candidates, to the serving BS in step 507. It is assumed that the handover candidates selected by the MS1 510 include the BS B 540 and the handover candidates selected by the MS2 520 include the BS A 530. The BS A 530 and the BS B 540 provide the information of the handover candidates to the CoMP control station 550 in step 509.

The CoMP control station 550 obtaining the information of the handover candidates determines MSs and BSs to participate in the cooperative transmission using the information of the candidates selected by the MSs in step 511. Since the handover candidates of the MS1 510 include the BS B 540, the MS1 510 can connect to both of the BS A 530 and the BS B 540. Since the handover candidates of the MS2 520 include the BS A 530, the MS2 520 can connect to both of the BS A 530 and the BS B 540. Hence, the CoMP control station 550 determines to involve the MS1 510, the MS2 520, the BS A 530, and the BS B 540 in the cooperative transmission. The CoMP control station 550 determining the BSs and the MSs to participate in the cooperative transmission transmits a cooperative transmission REQ message including setup information required for the cooperative transmission, such as information designating the cooperative MSs, pilot pattern, and variable for determining the permutation pattern, to the BS A 530 and the BS B 540 in step 513.

The BS A 530 and the BS B 540 receiving the cooperative transmission REQ message determine to conduct the cooperative transmission and transmit a MAP message for the cooperative transmission to the MS1 510 and the MS2 520 using the setup information obtained from the cooperative transmission REQ message in step 515. That is, the BS A 530 and the BS B 540 allocate the resource in the CoMP zone and transmit the MAP message including the resource allocation information and the pilot allocation information. Hence, the MS1 510, the MS2 520, the BS A 530, and the BS B 540 perform the cooperative transmission through the resources in the CoMP zone in step 517.

Figure 6:
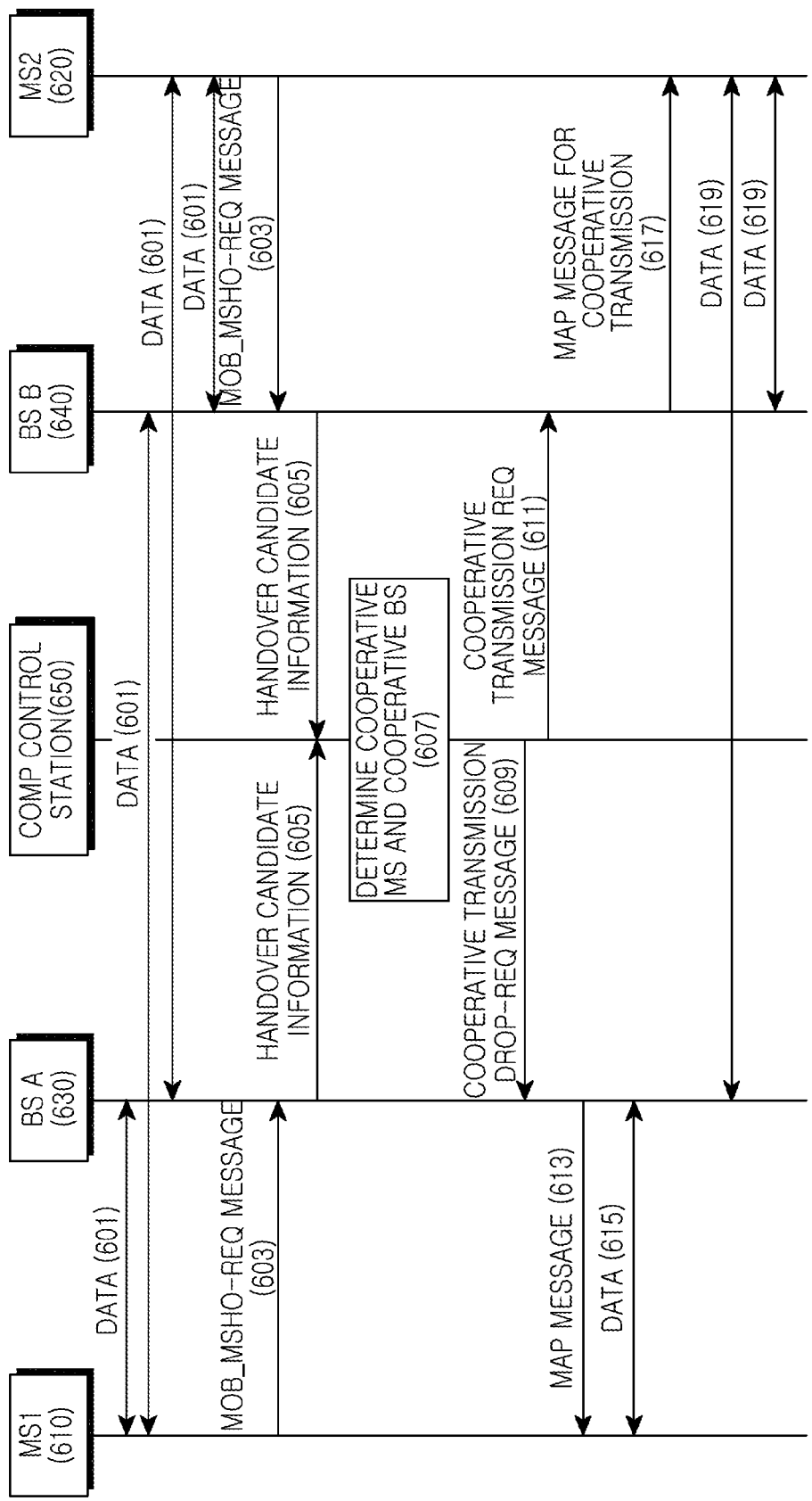
FIG. 6 illustrates signal exchanges for ending the cooperative transmission using handover related information in a broadband wireless communication system according to an exemplary embodiment of the present invention.

FIG. 6 illustrates signal exchanges for ending cooperative transmission using handover related information in a broadband wireless communication system according to an exemplary embodiment of the present invention.

Referring to FIG. 6, a cooperative transmission involves an MS1 610, an MS2 620, a BS A 630, and a BS B 640. A CoMP control station 650 controls the cooperative transmission. The CoMP control station 650 can be one of the cooperative BSs, or an upper node of the BS. The MS1 610 accesses the BS A 630 and the MS2 620 accesses the BS B 640.

In step 601, the MS1 610, the MS2 620, the BS A 630, and the BS B 640 conduct the cooperative transmission through resources of the CoMP zone. In the process of the cooperative transmission, the MS1 610 and the MS2 620 determine the channel quality of neighbor BSs and determine BSs of the channel quality exceeding a threshold, as handover candidates. Herein, information of the neighbor BSs is obtained from a MOB_NBR_ADV message received from the serving BS. The MS1 610 and the MS2 620 transmit a MOB_MSHO-REQ message including the candidates and the CQI of the candidates to their serving BS in step 603. At this time, the handover candidates selected by the MS1 610 do not include the BS B 640, and the handover candidates selected by the MS2 620 include the BS A 630. The BS A 630 and the BS B 640 provide information of the handover candidates to the CoMP control station 650 in step 605.

The CoMP control station 650 obtaining the information of the handover candidates recognizes that the MS1 610 is not connectable to the BS B 640 since the handover candidates of the MS1 610 do not include the BS B 640, and determines to exclude the MS1 610 from the cooperative transmission of the MS1 610, the MS2 620, the BS A 630, and the BS B 640 in step 607. Thus, the CoMP control station 650 transmits a cooperative transmission drop-REQ message requesting to drop the MS1 610 from the cooperative transmission, to the BS A 630 which is the serving BS of the MS1 610 in step 609. The CoMP control station 650 transmits a cooperative transmission REQ message instructing the cooperative transmission of the MS2 620, the BS A 630, and the BS B 640, to the BS B 640 which is the serving BS of the MS2 620 in step 611. Herein, the cooperative transmission REQ message includes the setup information required for the cooperative transmission, such as pilot pattern and variable determining the permutation pattern. Herein, the pilot pattern is to distinguish the cooperative MSs, and can be replaced by the orthogonal code for the same purpose.

The BS A 630 transmits a MAP message for the normal communication to the MS1 610 in step 613 and normally communicates with the MS1 610 in step 615. The BS B 640 transmits a MAP message for the cooperative transmission to the MS2 620 in step 617. The MS2 620, the BS A 630, and the BS B 640 carry out the cooperative transmission using the resources of the CoMP zone in step 619.

In an exemplary implementation, the CQI determined by the MS is used to start and end the cooperative transmission, which is now explained.

Figure 7:
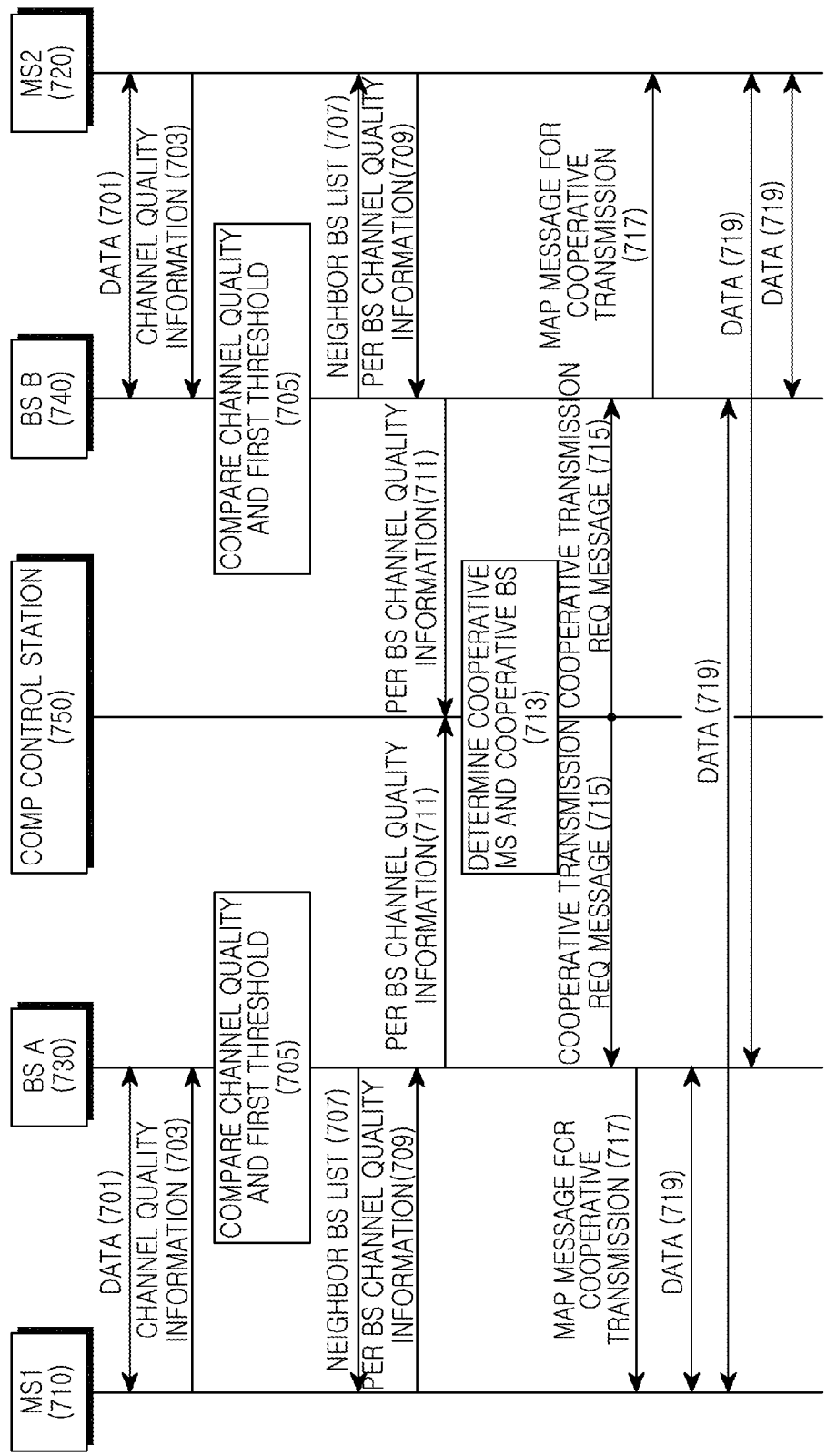
FIG. 7 illustrates signal exchanges for initiating a cooperative transmission using Channel Quality Information (CQI) in a broadband wireless communication system according to an exemplary embodiment of the present invention.

FIG. 7 illustrates signal exchanges for initiating cooperative transmission using CQI in a broadband wireless communication system according to an exemplary embodiment of the present invention.

Referring to FIG. 7, the cooperative transmission involves an MS1 710, an MS2 720, a BS A 730, and a BS B 740. At this time, a CoMP control station 750 for controlling the cooperative transmission exists. The CoMP control station 750 can be one of the cooperative BS, or an upper node of the BSs. The MS1 710 accesses the BS A 730 and the MS2 720 accesses the BS B 740.

In step 701, the MS1 710 performs normal communication with the BS A 730 and the MS2 720 performs normal communication with the BS B 740. In the process of the communication, the MS1 710 and the MS2 720 determine the channel quality of their serving BS and report the channel quality to the serving BS in step 703. The BS A 730 and the BS B 740 receiving the channel quality reports examine whether the reported channel quality falls below a first threshold in step 705. Herein, the first threshold may be a reference value for determining whether the MS travels in the cell edge of the serving BS. The BS A 730 and the BS B 740 pause the resource allocation to the MS1 710 and the MS2 720 and provide a neighbor BS list to the MS1 710 and the MS2 720 in step 707. Herein, the neighbor BS list of the BS A 730 includes the BS B 740, and the neighbor BS list of the BS B 740 includes the BS A 730. The MS1 710 and the MS2 720 receiving the neighbor BS list determine channel qualities of the serving BS and the neighbor BSs and report the determined channel qualities to the serving BS in step 709. The BS A 730 and the BS B 740 forward the channel qualities reported from the MS1 710 and the MS2 720 to the CoMP control station in step 711. The channel quality of the MS1 710 with respect to the BS B 740 and the channel quality of the MS2 720 with respect to the BS A 730 are greater than a second threshold. Herein, the second threshold may be a reference value for determining whether the MS is close to the cell of the neighbor BS.

The CoMP control station 750 obtaining the channel qualities determines MSs and BSs to participate in the cooperative transmission using the channel qualities determined by the MSs in step 713. Since the channel quality of the MS1 710 with respect to the BS B 740 and the channel quality of the MS2 720 with respect to the BS A 730 are greater than the second threshold, the MS1 710 is close to the cell of the BS B 740 and the MS2 720 is close to the cell of the BS A 730. Thus, the CoMP control station 750 determines to involve the MS1 710, the MS2 720, the BS A 730, and the BS B 740 in the cooperative transmission. The CoMP control station 750 transmits a cooperative transmission REQ message including the setup information required for the cooperative transmission, such as information designating the cooperative MS, pilot pattern, and variable determining the permutation pattern, to the BS A 730 and the BS B 740 in step 715. Herein, the pilot pattern, which is to distinguish the cooperative MSs, can be replaced by the orthogonal code for the same purpose.

The BS A 730 and the BS B 740 receiving the cooperative transmission REQ message determine to conduct the cooperative transmission, and transmit a MAP message for the cooperative transmission to the MS1 710 and the MS2 720 using the setup information acquired from the cooperative transmission REQ message in step 717. In more detail, the BS A 730 and the BS B 740 allocate the resources in the CoMP zone and transmit the MAP message including the resource allocation information and the pilot allocation information. Hence, the MS1 710, the MS2 720, the BS A 730, and the BS B 740 perform the cooperative transmission using the resources of the CoMP zone in step 719.

Figure 8:
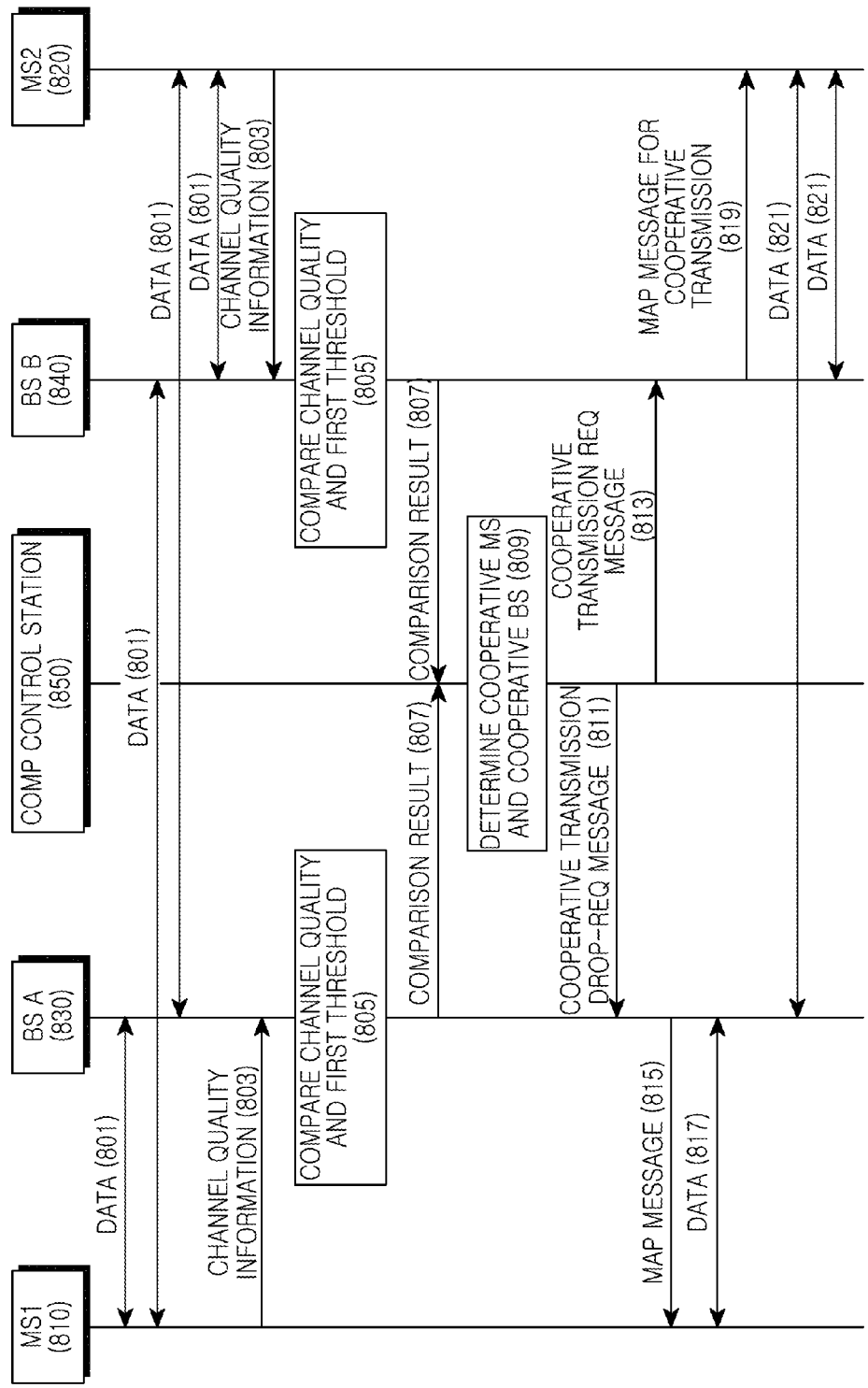
FIG. 8 illustrates signal exchanges for ending a cooperative transmission using CQI in a broadband wireless communication system according to an exemplary embodiment of the present invention.

FIG. 8 illustrates signal exchanges for ending a cooperative transmission using CQI in a broadband wireless communication system according to an exemplary embodiment of the present invention.

Referring to FIG. 8, the cooperative transmission involves an MS1 810, an MS2 820, a BS A 830, and a BS B 840. A CoMP control station 850 controls the cooperative transmission. The CoMP control station 850 can be one of the cooperative BSs, or an upper node of the BS. The MS1 810 accesses the BS A 830 and the MS2 820 accesses the BS B 840.

In step 801, the MS1 810, the MS2 820, the BS A 830, and the BS B 840 conduct the cooperative transmission through the resources of the CoMP zone. In the process of the cooperative transmission, the MS1 810 and the MS2 820 determine the channel quality of the serving BS and report the channel quality to the serving BS in step 803. The BS A 830 receiving the channel quality report confirms that the channel quality of the MS1 810 is greater than a threshold, and the BS B 840 confirms that the channel quality of the MS2 820 is less than the threshold in step 805. The BS A 830 and the BS B 840 report the comparison result of the reported channel quality and the threshold to the CoMP control station 850 in step 807.

The CoMP control station 850 recognizes that the MS1 810 is close to the center of the cell of the BS A 830, based on the report that the channel quality between the MS1 810 and the BS A 830 is greater than the threshold, and determines to exclude the MS1 810 from the cooperative transmission of the MS1 810, the MS2 820, the BS A 830 and the BS B 840 in step 809. The CoMP control station 850 transmits a cooperative transmission drop-REQ message requesting to drop the MS1 810 from the cooperative transmission, to the BS A 830 which is the serving BS of the MS1 810 in step 811. The CoMP control station 850 transmits a cooperative transmission REQ message instructing the cooperative transmission of the MS2 820, the BS A 830, and the BS B 840, to the BS B 840 which is the serving BS of the MS2 820 in step 813. Herein, the cooperative transmission REQ message includes the setup information required for the cooperative transmission, such as a pilot pattern and variable for determining the permutation pattern. Herein, the pilot pattern is to distinguish the cooperative MSs, and can be replaced by the orthogonal code for the same purpose.

The BS A 830 transmits a MAP message for normal communication to the MS1 810 in step 815 and normally communicates with the MS1 810 in step 817. The BS B 840 transmits a MAP message for cooperative transmission to the MS2 820 in step 819. The MS2 820, the BS A 830, and the BS B 840 carry out the cooperative transmission using the resources of the CoMP zone in step 821.

Now, operations and structures of a BS, a CoMP control station, and an MS for cooperative transmission are described in more detail by referring to the drawings. Hereafter, an exemplary embodiment relates to cooperative transmission using handover related information. Another exemplary embodiment relates to cooperative transmission using CQI.

Figure 9:
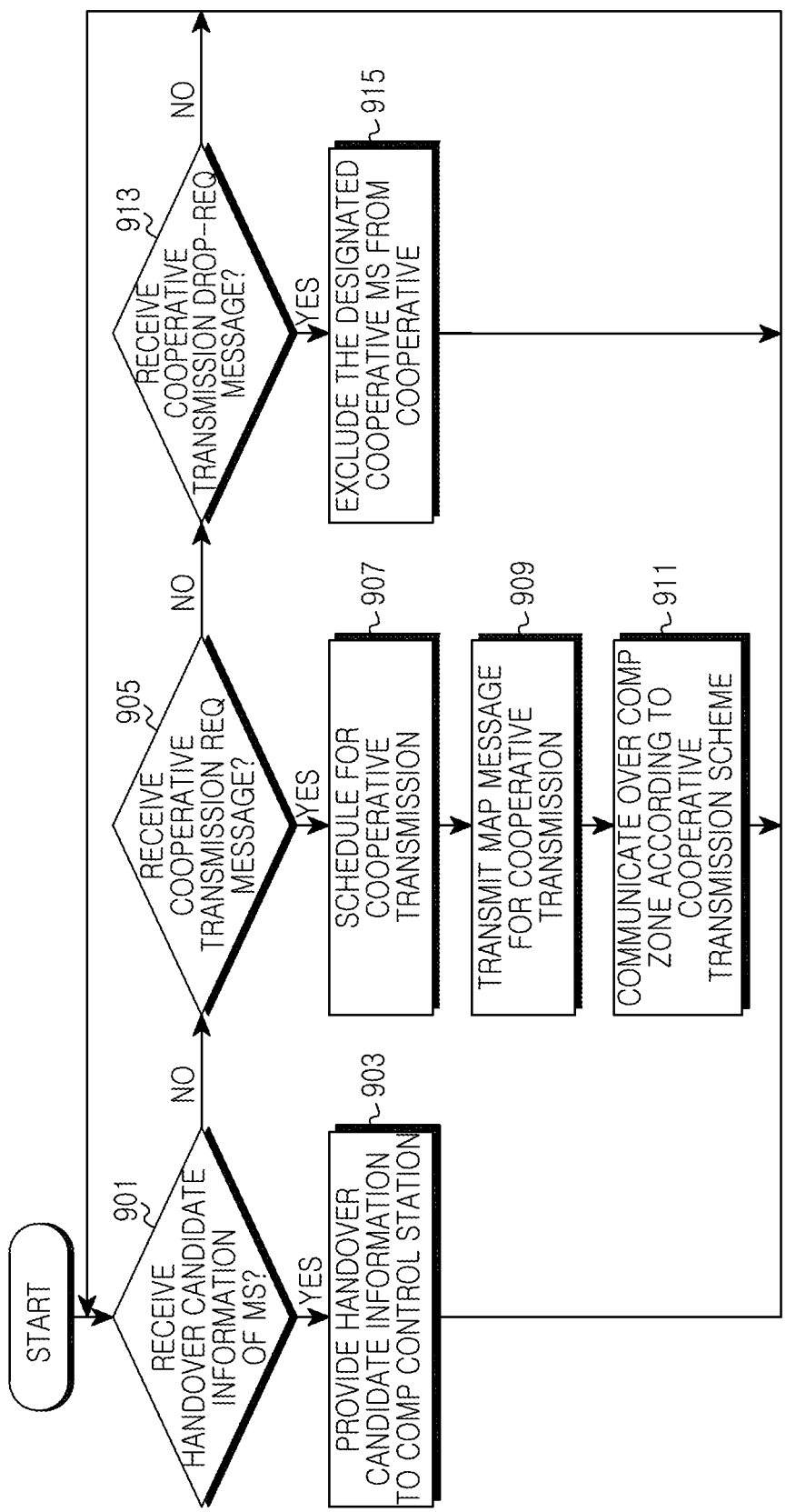
FIG. 9 illustrates operations of a base station in a broadband wireless communication system according to an exemplary embodiment of the present invention.

FIG. 9 illustrates operations of a BS in a broadband wireless communication system according to an exemplary embodiment of the present invention.

Referring to FIG. 9, in step 901, the BS determines whether the handover candidate information of the MS is received. The handover candidate information may include the CQI of at least one neighbor BS of the BS, which is determined by the MS.

If it is determined in step 901 that the BS receives the handover candidate information, the BS provides the handover candidate information to the CoMP control station in step 903. The CoMP control station is the entity for controlling the cooperative transmission. The BS provides the handover candidate information to the CoMP control station so as to determine whether to conduct the cooperative transmission and to determine the cooperative group.

On the other hand, if it is determined in step 901 that the BS does not receive handover candidate information, the BS determines whether the cooperative transmission REQ message is received from the CoMP control station in step 905. Herein, the cooperative transmission REQ message includes the setup information required for the cooperative transmission, such as information designating the cooperative MSs, pilot pattern, and variable determining the permutation pattern. The pilot pattern distinguishes the cooperative MSs and can be replaced by the orthogonal code for the same purpose.

If it is determined in step 905 that the BS receives the cooperative transmission REQ message, the BS schedules for the cooperative transmission in step 907. More specifically, the BS allocates the resources in the predefined CoMP zone occupying part of the frame, and determines a weight matrix to use for the cooperative transmission. Herein, the weight matrix is determined by the CoMP control station and provided to the BS. For doing so, the CoMP control station needs to acquire the channel information between the BS and at least one cooperative MS. Although it is not illustrated in FIG. 9, the BS provides the channel information between the BS and at least one cooperative MS to the CoMP control station.

In step 909, the BS transmits the MAP message for the cooperative transmission to the cooperative MS. The BS transmits the MAP message including the allocation information of the resources in the CoMP zone, the pilot pattern, and the variable determining the permutation pattern. Herein, the pilot pattern, which is to distinguish the cooperative MSs, can be replaced by the orthogonal code for the same purpose.

In step 911, the BS communicates over the CoMP zone according to the cooperative transmission scheme. The communication according to the cooperative transmission includes at least one of the uplink communication and the downlink communication. For example, in the downlink communication, the BS processes the transmit signal using the row or the column allocated to the BS in the weight matrix and transmits the transmit signal using the resource in the predefined CoMP zone occupying part of the frame. In the uplink communication, the BS receives a signal over the resource in the predefined CoMP zone occupying part of the frame, and processes the received signal using the row or the column allocated to the BS in the weight matrix. The BS processes the signal according to the permutation rule defined by the variable that determines the permutation pattern and is carried by the cooperative transmission REQ message. The BS can process the signal in the CoMP zone using a channel matrix including only channels of the channel quality greater than the threshold among the channels of the cooperative MSs.

On the other hand, if it is determined in step 905 that the BS does not receive the cooperative transmission REQ message, the BS determines whether the cooperative transmission drop-REQ message is received in step 913. The cooperative transmission drop-REQ message is a message that designates the cooperative MS to exclude from the cooperative group.

If it is determined in step 913 that the BS receives the cooperative transmission drop-REQ message, the BS excludes the designated cooperative MS from the cooperative group in step 915. In result, the cooperative MS changes to the normal MS and is allocated the resource in the non-CoMP zone.

Figure 10:
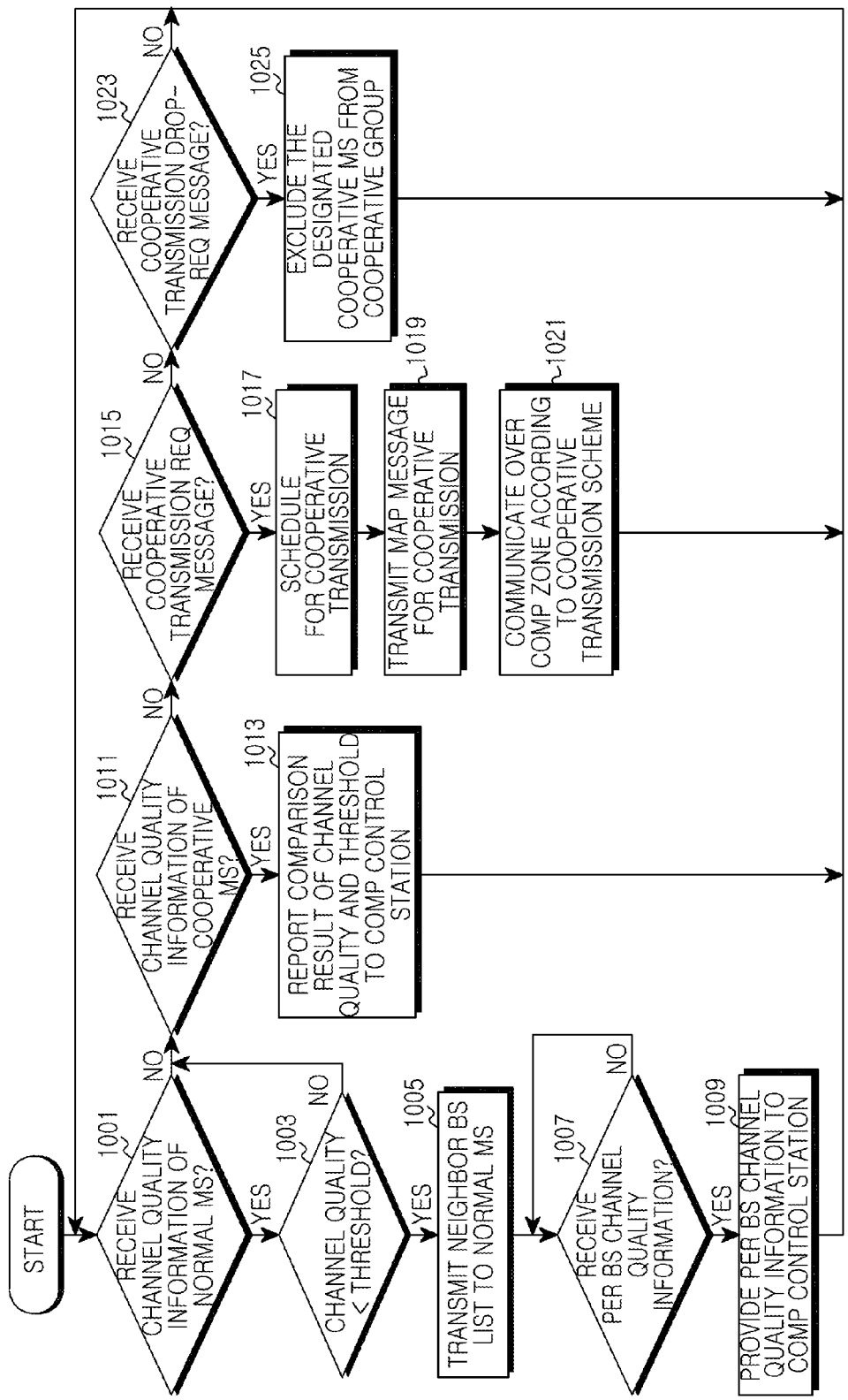
FIG. 10 illustrates operations of a base station in a broadband wireless communication system according to an exemplary embodiment of the present invention.

FIG. 10 illustrates operations of a BS in a broadband wireless communication system according to an exemplary embodiment of the present invention.

Referring to FIG. 10, in step 1001 the BS determines whether the CQI is received from the normal MS. Herein, the CQI is CQI between the normal MS and the BS.

If it is determined in step 1001 that the BS receives the CQI, the BS determines if the channel quality is less than the threshold in step 1003. Herein, the threshold may be a reference value for determining whether the MS travels in the cell edge of the BS.

If it is determined in step 1003 that the channel quality falls below the threshold, the BS transmits the neighbor BS list to the normal MS in step 1005. Since the channel quality is lower than the threshold, the BS determines the normal MS traveling in the cell edge, and transmits the neighbor BS list in order to collect information for determining whether the cooperative transmission is feasible.

In step 1007, the BS determines whether the CQI per BS with respect to the neighbor BSs is received. If it is determined in step 1007 that the CQI per BS is received, the BS provides the CQI per BS to the CoMP control station in step 1009, and otherwise repeats step 1007.

If it is determined in step 1001 that the BS does not receive CQI from the normal MS, the BS determines whether the CQI is received from the cooperative MS in step 1011. Herein, the CQI is CQI between the cooperative MS and the BS.

If it is determined in step 1011 that the BS receives the CQI from the cooperative MS, the BS compares the channel quality and the threshold and reports the comparison result of the channel quality and the threshold to the CoMP control station in step 1013. That is, the BS reports the comparison result to the CoMP control station so as to provide the CoMP control station with the information for determining whether to drop the cooperative MS.

If it is determined in step 1011 that the BS does not receive the CQI from the cooperative MS, the BS determines whether the cooperative transmission REQ message is received from the CoMP control station in step 1015. Herein, the cooperative transmission REQ message includes the setup information required for the cooperative transmission, such as information designating the cooperative MSs, pilot pattern, and variable determining the permutation pattern. The pilot pattern distinguishes the cooperative MSs and can be replaced by the orthogonal code for the same purpose.

If it is determined in step 1015 that the BS receives the cooperative transmission REQ message, the BS schedules for the cooperative transmission in step 1017. More specifically, the BS allocates the resources in the predefined CoMP zone occupying part of the frame, and determines the weight matrix to use for the cooperative transmission. Herein, the weight matrix is determined by the CoMP control station and provided to the BS. For doing so, the CoMP control station needs to acquire the channel information between the BS and at least one cooperative MS. Although it is not illustrated in FIG. 10, the BS provides the channel information between the BS and at least one cooperative MS to the CoMP control station.

In step 1019, the BS transmits the MAP message for the cooperative transmission to the cooperative MS. The BS transmits the MAP message including the allocation information of the resources in the CoMP zone, the pilot pattern, and the variable determining the permutation pattern. Herein, the pilot pattern, which is to distinguish the cooperative MSs, can be replaced by the orthogonal code for the same purpose.

In step 1021, the BS communicates over the CoMP zone according to the cooperative transmission scheme. The communication according to the cooperative transmission includes at least one of the uplink communication and the downlink communication. For example, in the downlink communication, the BS processes the transmit signal using the row or the column allocated to the BS in the weight matrix and transmits the transmit signal over the resource in the predefined CoMP zone occupying part of the frame. In the uplink communication, the BS receives a signal over the resource in the predefined CoMP zone occupying part of the frame, and processes the received signal using the row or the column allocated to the BS in the weight matrix. The BS processes the signal according to the permutation rule defined by the variable that determines the permutation pattern and is carried by the cooperative transmission REQ message.

If it is determined in step 1015 that the BS does not receive the cooperative transmission REQ message, the BS determines whether the cooperative transmission drop-REQ message is received in step 1023. The cooperative transmission drop-REQ message is the message that designates the cooperative MS to exclude from the cooperative group.

If it is determined in step 1023 that the BS receives the cooperative transmission drop-REQ message, the BS excludes the designated cooperative MS from the cooperative group in step 1025. As a result, the cooperative MS changes to the normal MS and is allocated the resource in the non-CoMP zone.

Figure 11:
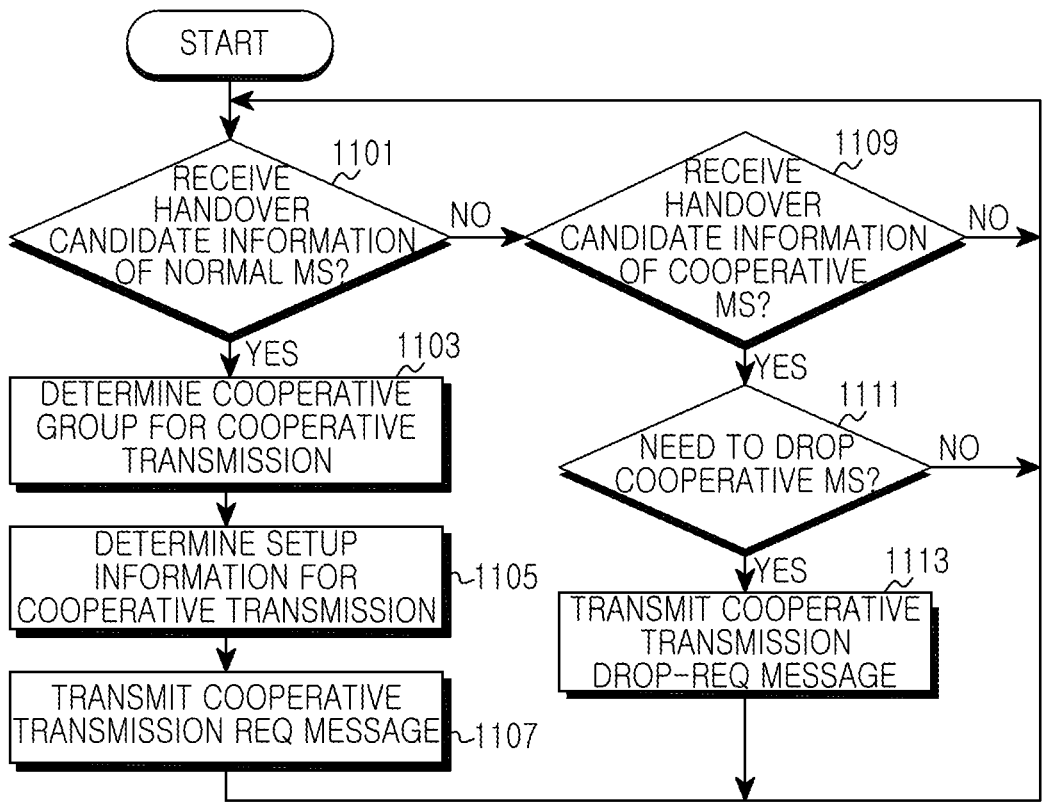
FIG. 11 illustrates operations of a CoMP control station in a broadband wireless communication system according to an exemplary embodiment of the present invention.

FIG. 11 illustrates operations of a CoMP control station in a broadband wireless communication system according to an exemplary embodiment of the present invention.

Referring to FIG. 11, in step 1101, the CoMP control station determines whether the handover candidate information of the normal MS is received. Herein, the handover candidate information is provided from the serving BS of the normal MS.

If it is determined in step 1101 that the handover candidate information is received, the CoMP control station determines the cooperative group for the cooperative transmission using the handover candidate information in step 1103. At this time, the handover candidate information of the multiple normal MSs can be used. That is, the CoMP control station determines the normal MS as the cooperative MS, and the serving BS of the cooperative MS and at least one handover candidate as the cooperative BSs. When using the handover candidate information of the multiple normal MSs, the CoMP control station determines the normal MSs as the cooperative MSs, and the serving BSs of the normal MSs and at least one handover candidate as the cooperative BSs.

In step 1105, the CoMP control station determines the setup information for the cooperative transmission. Herein, the setup information includes the pilot patterns of the cooperative MSs, and the variable determining the permutation pattern. The pilot pattern is determined differently per cooperative MS, and the variable determining the permutation pattern is determined as the common value. Herein, the pilot pattern is to distinguish the cooperative MSs, and can be replaced by the orthogonal code for the same purpose.

In step 1107, the CoMP control station transmits the cooperative transmission REQ message to the cooperative BSs. Herein, the cooperative transmission REQ message includes the information designating the cooperative MSs, the pilot pattern, and the variable determining the permutation pattern. Herein, the pilot pattern is to distinguish the cooperative MSs, and can be replaced by the orthogonal code for the same purpose.

If it is determined in step 1101 that the handover candidate information of the normal MS is not received, the CoMP control station determines whether the handover candidate information of the cooperative MS is received in step 1109. Herein, the handover candidate information is provided from the serving BS of the cooperative MS.

If it is determined in step 1109 that the handover candidate information is received, the CoMP control station determines whether it is necessary to drop the cooperative MS in step 1111. When at least one of the cooperative BSs of the cooperative group to which the cooperative MS belongs is neither the serving BS of the cooperative MS nor the handover candidates, this implies that the cooperative MS is not connectable to the corresponding cooperative BS. Accordingly, when at least one of the cooperative BSs of the cooperative group to which the cooperative MS belongs is neither the serving BS of the cooperative MS nor the handover candidates, the CoMP control station determines to drop the cooperative MS.

If it is determined in step 1111 that the cooperative MS needs to be dropped, the CoMP control station transmits the cooperative transmission drop-REQ message instructing to exclude the cooperative MS from the cooperative group, to the serving BS of the cooperative MS in step 1113.

Figure 12:
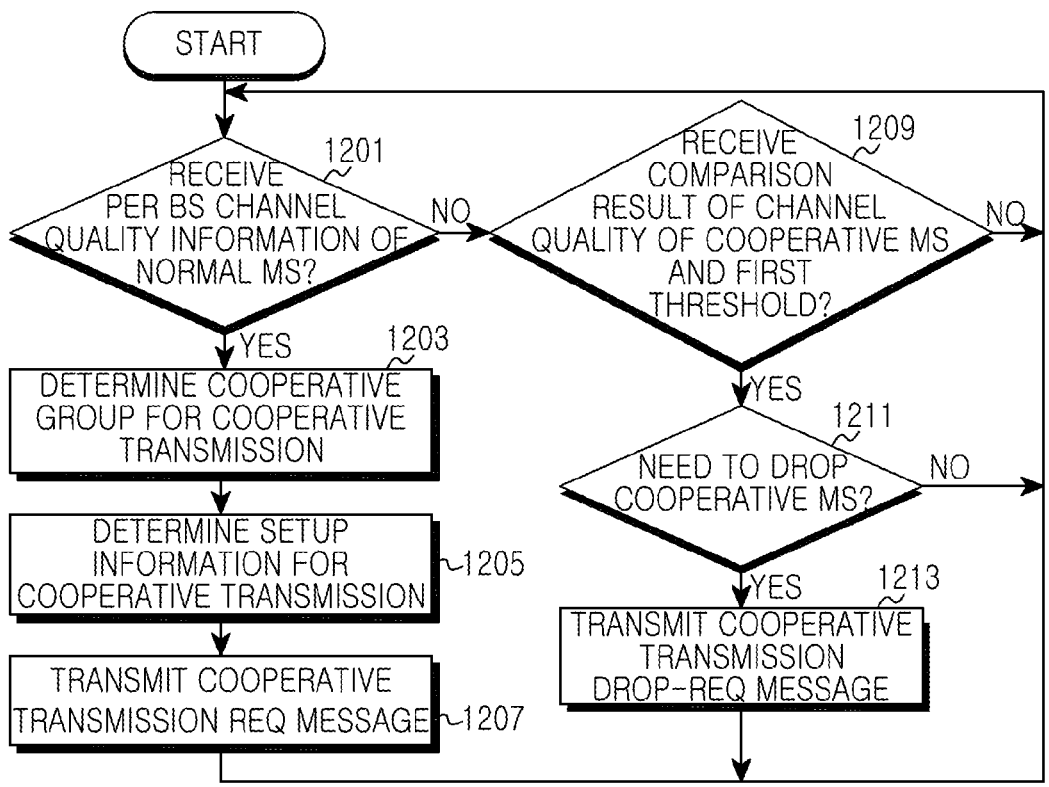
FIG. 12 illustrates operations of a CoMP control station in a broadband wireless communication system according to an exemplary embodiment of the present invention.

FIG. 12 illustrates operations of a CoMP control station in a broadband wireless communication system according to another exemplary embodiment of the present invention.

Referring to FIG. 12, in step 1201, the CoMP control station determines whether the CQI of the normal MS per BS is received. Herein, the CQI per BS is provided from the serving BS of the normal MS.

If it is determined in step 1201 that the CQI per BS is received, the CoMP control station determines the cooperative group for the cooperative transmission using the CQI per BS in step 1203. In so doing, the per BS CQI of the plurality of normal MSs can be used. That is, the CoMP control station determines the normal MS as the cooperative MS, and the serving BS of the cooperative MS and at least one neighbor BS having the channel quality greater than the second threshold as the cooperative BSs. When using the CQI per BS of the multiple normal MSs, the CoMP control station determines the normal MSs as the cooperative MSs, and the serving BSs of the normal MSs and at least one neighbor BS having the channel quality greater than the second threshold as the cooperative BSs. Herein, the second threshold is a reference value for determining whether the MS is close to the cell of the neighbor BS.

In step 1205, the CoMP control station determines the setup information for the cooperative transmission. Herein, the setup information includes the pilot patterns of the cooperative MSs, and the variable determining the permutation pattern. The pilot pattern is determined differently per cooperative MS, and the variable determining the permutation pattern is determined as the common value. Herein, the pilot pattern is to distinguish the cooperative MSs, and can be replaced by the orthogonal code for the same purpose.

In step 1207, the CoMP control station transmits the cooperative transmission REQ message to the cooperative BSs. Herein, the cooperative transmission REQ message includes the information designating the cooperative MSs, the pilot pattern, the variable determining the permutation pattern. Herein, the pilot pattern is to distinguish the cooperative MSs, and can be replaced by the orthogonal code for the same purpose.

If it is determined in step 1201 that the CQI per BS of the normal MS is not received, the CoMP control station determines whether the comparison result of the channel quality of the cooperative MS and the first threshold is received in step 1209. Herein, the first threshold may be the reference value for determining whether the MS is traveling in the cell edge of the serving BS. The comparison result of the channel quality of the cooperative MS and the first threshold is provided from the serving BS of the cooperative MS. The channel quality is the channel quality between the cooperative MS and the serving BS of the cooperative MS.

If it is determined in step 1209 that the comparison result of the channel quality of the cooperative MS and the first threshold is received, the CoMP control station determines whether it is necessary to drop the cooperative MS in step 1211. The channel quality of the cooperative MS greater than the first threshold implies that the cooperative MS is close to the center of the cell of the serving BS. In this situation, the cooperative MS is not connectable to the neighbor BS. Hence, when the channel quality of the cooperative MS is greater than the first threshold, the CoMP control station determines to drop the cooperative MS.

If it is determined in step 1211 that the cooperative MS needs to be dropped, the CoMP control station transmits the cooperative transmission drop-REQ message instructing to exclude the cooperative MS from the cooperative group, to the serving BS of the cooperative MS in step 1213.

Figure 13:
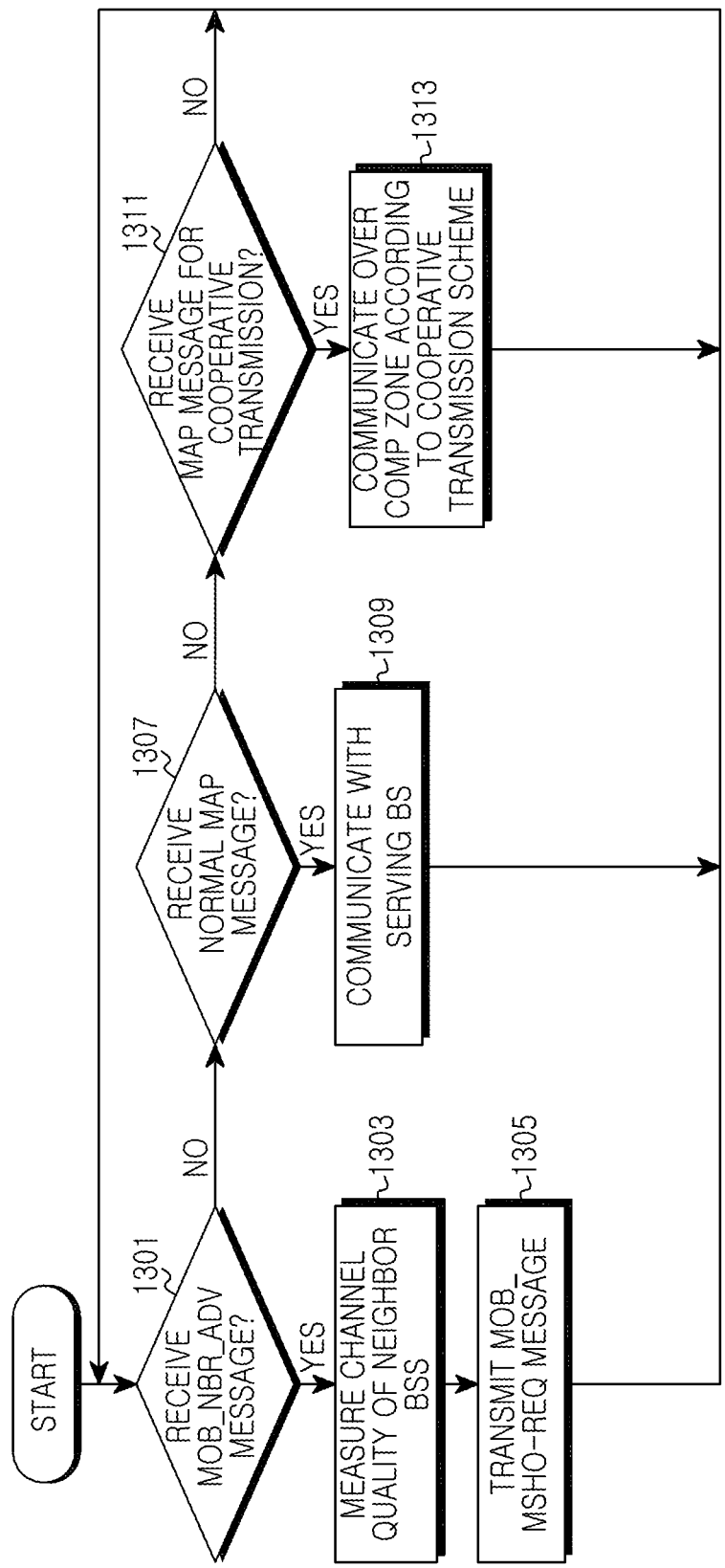
FIG. 13 illustrates operations of a mobile station in a broadband wireless communication system according to an exemplary embodiment of the present invention.

FIG. 13 illustrates operations of the MS in the broadband wireless communication system according to one exemplary embodiment of the present invention.

Referring to FIG. 13, in step 1301, the MS determines whether the MOB_NBR_ADV message is received from its serving BS. The MOB_NBR_ADV message includes the information relating to the neighbor BSs of the serving BS, and the information of the neighbor BSs includes identifies of the neighbor BSs and the information required to determine the channel quality with respect to the neighbor BSs.

If it is determined in step 1301 that the MOB_NBR_ADV message is received, the MS determines the channel quality of the neighbor BSs in step 1303. To acquire indexes for selecting the handover candidate from the neighbor BSs, the MS determines the channel quality of the neighbor BSs.

In step 1305, the MS transmits a MOB_MSHO-REQ message. Herein, the MOB_MSHO-REQ message includes the handover candidates that are the neighbor BSs having the channel quality greater than the threshold, and the CQI of the handover candidates. That is, the MS selects the neighbor BS having the channel quality over the threshold as the handover candidate, and transmits the MOB_MSHO-REQ message informing of the handover candidate to its serving BS.

If it is determined in step 1301 that the MOB_NBR_ADV message is not received, the MS determines whether a normal MAP message is received from the serving BS in step 1307. The normal MAP message indicates a MAP message other than the MAP message for the cooperative transmission. If it is determined in step 1307 that the normal MAP message is received, the MS communicates with the serving BS according to the resource allocation information acquired from the MAP message in step 1309.

If it is determined in step 1307 that the normal MAP message is not received, the MS determines whether the MAP message for the cooperative transmission is received in step 1311. Herein, the MAP message for the cooperative transmission includes the allocation information of the resources in the CoMP zone, the pilot pattern, and the variable determining the permutation pattern. Herein, the pilot pattern distinguishes the cooperative MSs and can be replaced by the orthogonal code for the same purpose.

If it is determined in step 1311 that the MAP message for the cooperative transmission is received, the MS communicates using the resource in the predefined CoMP zone occupying part of the frame according to the cooperative transmission scheme in step 1313. In so doing, the MS processes the signal according to the permutation rule defined by the variable determining the permutation pattern contained in the MAP message for the cooperative transmission, and transmits the pilot signal according to the pilot pattern carried by the MAP message for the cooperative transmission. When the pilot pattern is replaced by the orthogonal code, the MS transmits the transmit signal multiplied by the orthogonal code.

Figure 14:
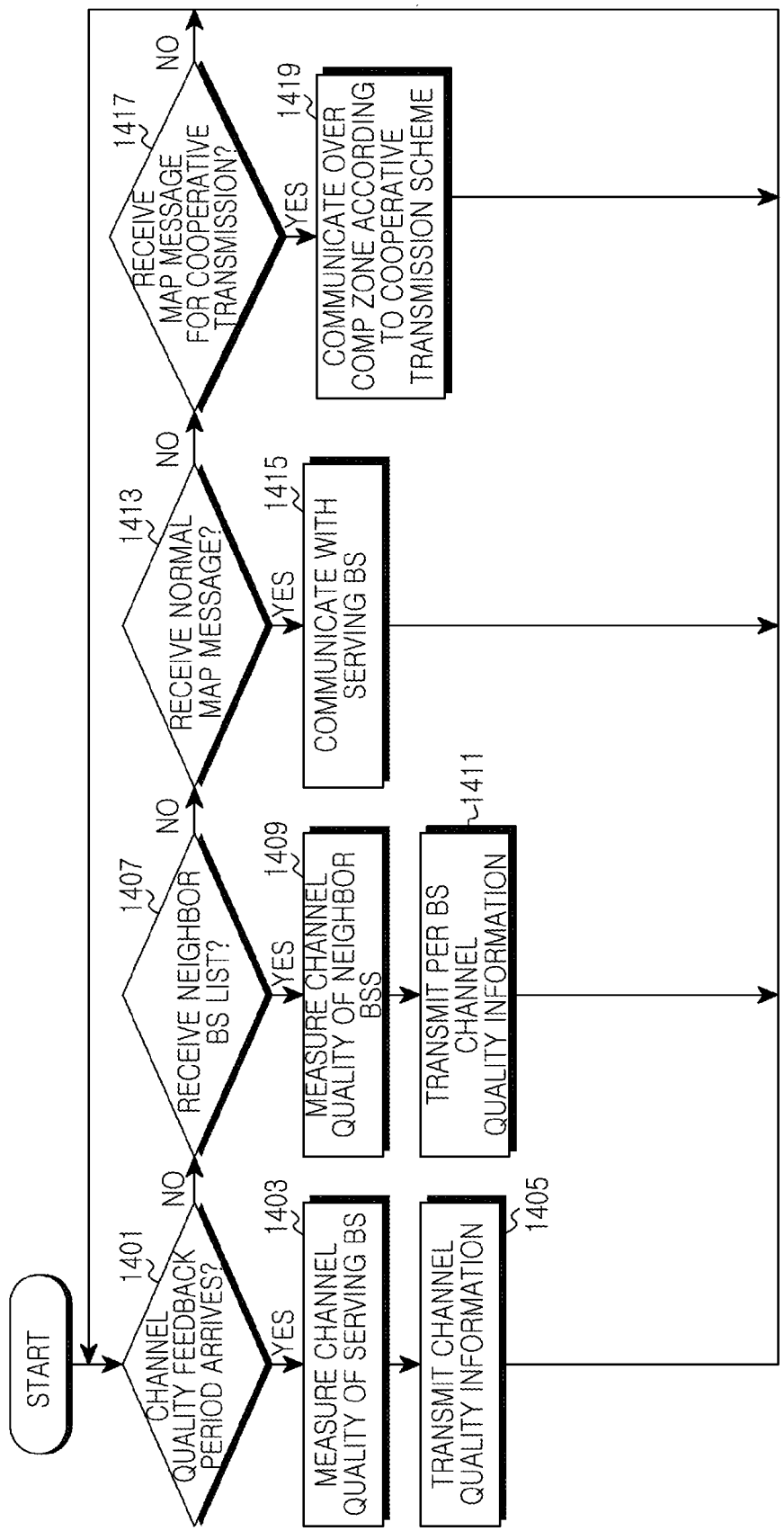
FIG. 14 illustrates operations of a mobile station in a broadband wireless communication system according to an exemplary embodiment of the present invention.

FIG. 14 illustrates operations of an MS in a broadband wireless communication system according to an exemplary embodiment of the present invention.

Referring to FIG. 14, in step 1401, the MS determines whether a channel quality feedback period arrives. The channel quality indicates the channel quality between the serving BS and the MS, and is periodically determined and reported while the MS is accessing the serving BS.

If it is determined in step 1401 that the channel quality feedback period arrives, the MS determines the channel quality of the serving BS in step 1403. For example, the channel quality is determined using a preamble signal.

In step 1405, the MS transmits the CQI of the serving BS to the serving BS.

If it is determined in step 1401 that the channel quality feedback period does not arrive, the MS determines whether the neighbor BS list is received from the serving BS in step 1407. The neighbor BS list includes the identifiers of the neighbor BSs and the information required to determine the channel quality of the neighbor BSs.

If it is determined in step 1407 that the neighbor BS list is received, the MS determines the channel quality of the neighbor BSs in step 1409. To collect the information required for the CoMP control station to determine the cooperative group, the MS determines the channel quality with respect to the neighbor BSs.

In step 1411, the MS transmits the per BS CQI of the neighbor BSs to the serving BS.

If it is determined in step 1407 that the neighbor BS list is not received, the MS determines whether a normal MAP message is received from the serving BS in step 1413. The normal MAP message indicates a MAP message other than the MAP message for the cooperative transmission. If it is determined in step 1413 that the normal MAP message is received, the MS communicates with the serving BS according to the resource allocation information acquired from the MAP message in step 1415.

On the other hand, if it is determined in step 1413 that the normal MAP message is not received, the MS determines whether the MAP message for the cooperative transmission is received in step 1417. Herein, the MAP message for the cooperative transmission includes the allocation information of the resources in the CoMP zone, the pilot pattern, and the variable determining the permutation pattern. Herein, the pilot pattern distinguishes the cooperative MSs and can be replaced by the orthogonal code for the same purpose.

If it is determined in step 1417 that the MAP message for the cooperative transmission is received, the MS communicates using the resource of the predefined CoMP zone occupying part of the frame according to the cooperative transmission scheme in step 1419. In so doing, the MS processes the signal according to the permutation rule defined by the variable determining the permutation pattern contained in the MAP message for the cooperative transmission, and transmits the pilot signal according to the pilot pattern carried by the MAP message for the cooperative transmission. When the pilot pattern is replaced by the orthogonal code, the MS transmits the transmit signal multiplied by the orthogonal code.

Figure 15:
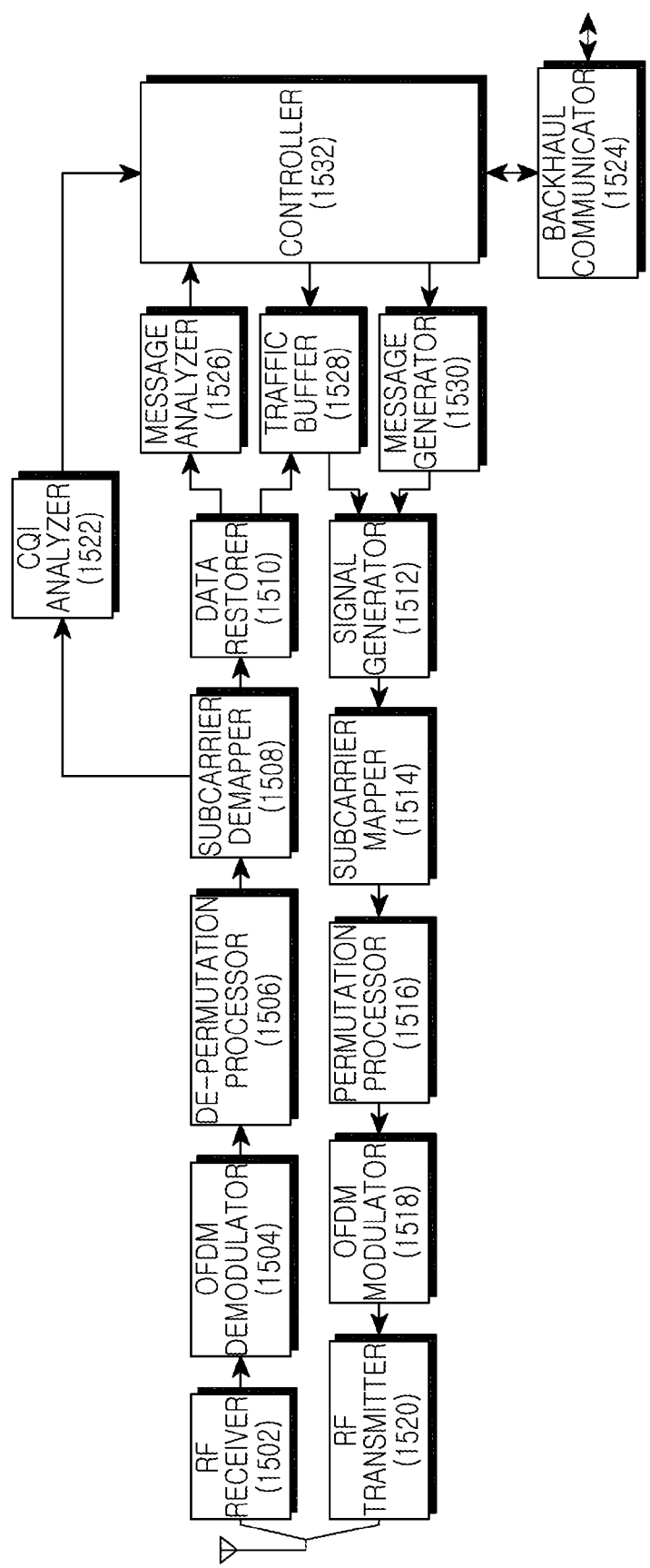
FIG. 15 is a block diagram of a base station in a broadband wireless communication system according to an exemplary embodiment of the present invention.

FIG. 15 is a block diagram of a BS in the broadband wireless communication system according to an exemplary embodiment of the present invention.

Referring to FIG. 15, the BS includes a Radio Frequency (RF) receiver 1502, an OFDM demodulator 1504, a de-permutation processor 1506, a subcarrier demapper 1508, a data restorer 1510, a signal generator 1512, a subcarrier mapper 1514, a permutation processor 1516, an OFDM modulator 1518, an RF transmitter 1520, a CQI analyzer 1522, a backhaul communicator 1524, a message analyzer 1526, a traffic buffer 1528, a message generator 1530, and a controller 1532.

The RF receiver 1502 down-coverts an RF signal received over an antenna to a baseband signal. The OFDM demodulator 1504 divides the signal output from the RF receiver 1502 into OFDM symbols and restores complex symbols mapped to the frequency domain using Fast Fourier Transform (FFT) process. The de-permutation processor 1506 arranges the permutated signals according to the defined permutation pattern. The subcarrier demapper 1508 classifies the complex symbols mapped to the frequency domain on the processing unit basis. The data restorer 1510 demodulates the complex symbols, and restores a data bit stream by channel-decoding the demodulated bit stream. Herein, the data bit stream includes traffic and the message. The data restorer 1510 processes the receive signal according to the weight matrix.

The signal generator 1512 channel-encodes the transmit bit stream, and modulates and converts the channel-encoded bit stream to complex symbols. The signal generator 1512 processes the transmit signal according to the weight matrix. The subcarrier mapper 1514 maps the complex symbols to the frequency domain. The permutation processor 1516 permutates the signals mapped to the frequency domain according to the defined permutation pattern. The OFDM modulator 1518 converts the complex symbols mapped to the frequency domain to a time-domain signal using an Inverse FFT (IFFT) process, and constitutes OFDM symbols by attaching a Cyclic Prefix (CP). The RF transmitter 1520 up-converts the baseband signal to an RF signal and transmits the RF signal over the antenna.

The CQI analyzer 1522 confirms the channel quality fed back from the MS by analyzing the signal received over the CQI channel. For example, the signal received over the CQI channel is one of predefined codewords. The CQI analyzer 1522 confirms the fed-back channel quality using the correlation of the signal received over the CQI channel and the codewords. The backhaul communicator 1524 provides the interface for communicating with other entities of the system over the backhaul network. Herein, the other entities include the CoMP control station.

The message analyzer 1526 confirms the information contained in a control message received from the MS, and provides the information to the controller 1532. The traffic buffer 1528 temporarily stores traffic data sent and received to and from the MS, and outputs the stored traffic data under the control of the controller 1532. The message generator 1530 generates the control message sent to the MS. For example, the message generator 1530 generates the MOB_NBR_ADV message and the MAP message. The MAP message includes the normal MAP message and the MAP message for the cooperative transmission. Herein, the MAP message for the cooperative transmission includes the allocation information of the resources in the CoMP zone, the pilot pattern, and the variable determining the permutation pattern. The pilot pattern, which is to distinguish the cooperative MSs, can be replaced by the orthogonal code for the same purpose.

The controller 1532 controls the functions of the BS. The controller 1532 allocates the resources to the MSs, and provides the information required for the handover of the MSs. More particularly, the controller 1532 controls the functions for the cooperative transmission. The functions for the cooperative transmission include the function for collecting and providing the information required to determine the cooperative group, and the function for communicating according to the cooperative transmission scheme.

The function for collecting and providing the information required to determine the cooperative group varies in an exemplary embodiment using the handover related information and in another exemplary embodiment using the CQI.

In an exemplary embodiment, the controller 1532 operates as follows for the function of collecting and providing the information required to determine the cooperative group. When the handover candidate information is received from the MS accessing the BS, the controller 1532 provides the handover candidate information to the CoMP control station via the backhaul communicator 1524.

In another exemplary embodiment, the controller 1532 operates as follows for the function of collecting and providing the information required to determine the cooperative group. When the CQI analyzer 1522 confirms the CQI from the normal MS accessing the BS, the controller 1532 compares the channel quality with the threshold. When the channel quality is less than the threshold, the controller 1532 transmits the neighbor BS list to the normal MS. Next, when the message analyzer 1526 confirms the per BS CQI of the neighbor BSs received from the normal MS, the controller 1532 provides the per BS CQI to the CoMP control station via the backhaul communicator 1524. When the CQI analyzer 1522 confirms the CQI from the cooperative MS accessing the BS, the controller 1532 compares the channel quality with the threshold and reports the comparison result of the channel quality and the threshold to the CoMP control station via the backhaul communicator 1524.

To provide the function of communication based on cooperative transmission, the controller 1532 operates as follows. When the cooperative transmission REQ message is received from the CoMP control station via the backhaul communicator 1524, the controller 1532 schedules for the cooperative transmission. That is, the controller 1532 allocates the resource of the predefined CoMP zone, and determines the weight matrix for the cooperative transmission. Herein, the weight matrix is determined by the CoMP control station and then forwarded to the BS. The controller 1532 controls the message generator 1530 to generate and to transmit the MAP message for the cooperative transmission. Next, the controller 1532 controls to communicate over the CoMP zone according to the cooperative transmission scheme. For example, in the downlink communication, the controller 1532 controls the signal generator 1512 to process the transmit signal using the row or the column allocated to the BS in the weight matrix, and controls the subcarrier mapper 1514 to map the transmit signal to the resources of the CoMP zone. In the uplink communication, the controller 1532 controls the subcarrier demapper 1508 to demap the signal from the resources of the CoMP zone, and controls the data restorer 1510 to process the received signal using the row or the column allocated to the BS in the weight matrix. The controller 1532 controls the de-permutation processor 1506 and the permutation processor 1516 to permutate and de-permutate according to the permutation rule defined by the variable that determines the permutation pattern and is carried by the cooperative transmission REQ message. The controller 1532 can control to process the signal in the CoMP zone using the channel matrix including only channels of the channel quality greater than the threshold among the channels of the cooperative MSs. When the cooperative transmission drop-REQ message is received from the CoMP control station via the backhaul communicator 1524, the controller 1532 drops the cooperative MS designated by the cooperative transmission drop-REQ message, from the cooperative group. Thus, the cooperative MS is changed to the normal MS and allocated the resource in the non-CoMP zone.

Figure 16:
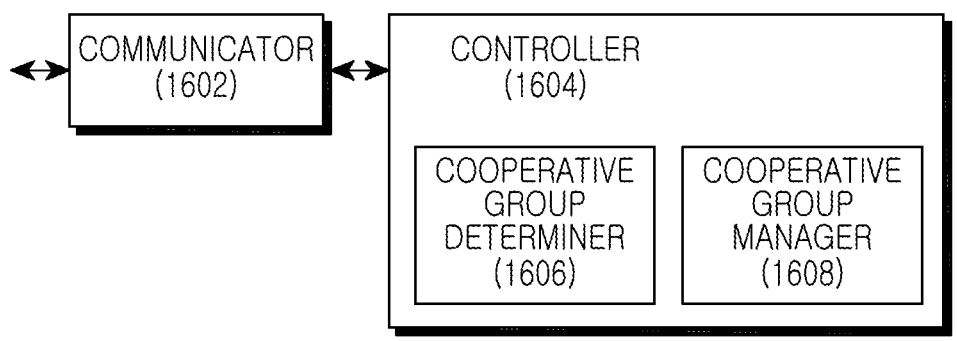
FIG. 16 is a block diagram of a CoMP control station in a broadband wireless communication system according to an exemplary embodiment of the present invention.

FIG. 16 is a block diagram of a CoMP control station in a broadband wireless communication system according to an exemplary embodiment of the present invention.

Referring to FIG. 16, the CoMP control station includes a communicator 1602 and a controller 1604.

The communicator 1602 provides the interface for communicating with other entities of the system over the backhaul network. Herein, the other entities include the BS. The controller 1604 controls the functions of the CoMP control station. The controller 1604 includes a cooperative group determiner 1606 for determining the cooperative group, and the cooperative group manager 1608 for managing information of the current status of the cooperative group. The controller 1604 performs functions for the cooperative communication through the cooperative group determiner 1606 and the cooperative group manager 1608. The functions for the cooperative communication include a function for determining the cooperative group and a function for dropping the cooperative MS.

For the function of determining the cooperative group in an exemplary embodiment, the controller 1604 operates as follows. When the handover candidate information of the normal MS is received from the BS via the communicator 1602, the cooperative group determiner 1606 determines the cooperative group for the cooperative transmission using the handover candidate information. In so doing, the handover candidate information of the multiple normal MSs can be used. More specifically, the cooperative group determiner 1606 determines the normal MS as the cooperative MS, and the serving BS of the cooperative MS and at least one handover candidate as the cooperative BSs. When using the handover candidate information of the multiple normal MSs, the cooperative group determiner 1606 determines the normal MSs as the cooperative MSs, and the serving BSs of the normal MSs and at least one handover candidate as the cooperative BSs. After the cooperative group determiner 1606 determines the cooperative group, the cooperative group manager 1608 determines the setup information for the cooperative transmission. Herein, the setup information includes the pilot patterns of the cooperative MSs, and the variable determining the permutation pattern. The pilot pattern is determined differently per cooperative MS, and the variable determining the permutation pattern is determined as the common value. Herein, the pilot pattern is to distinguish the cooperative MSs, and can be replaced by the orthogonal code for the same purpose.

For the function of determining the cooperative group in another exemplary embodiment, the controller 1604 operates as follows. When the per BS CQI determined by the normal MS is received from the BS via the communicator 1602, the cooperative group determiner 1606 determines the cooperative group for the cooperative transmission using the per BS CQI. In so doing, the per BS CQI of the multiple normal MSs can be used. More specifically, the cooperative group determiner 1606 determines the normal MS as the cooperative MS, and the serving BS of the cooperative MS and at least one neighbor BS having the channel quality greater than the second threshold as the cooperative BSs. When using the per BS CQI of the multiple normal MSs, the cooperative group determiner 1606 determines the normal MSs as the cooperative MSs, and the serving BSs of the normal MSs and at least one neighbor BS having the channel quality greater than the second threshold as the cooperative BSs. Herein, the second threshold is the reference value for determining whether the MS is close to the cell of the neighbor BS. After the cooperative group determiner 1606 determines the cooperative group, the cooperative group manager 1608 determines the setup information for the cooperative transmission.

For the function of dropping the cooperative MS in an exemplary embodiment, the controller 1604 operates as follows. When the handover candidate information of the cooperative MS is received from the BS via the communicator 1602, the cooperative group determiner 1606 determines whether to drop the cooperative MS. When at least one of the cooperative BSs of the cooperative group to which the cooperative MS belongs is neither the serving BS of the cooperative MS nor the handover candidates, this implies that the cooperative MS is not connectable to the corresponding cooperative BS. Accordingly, when at least one of the cooperative BSs of the cooperative group to which the cooperative MS belongs is neither the serving BS of the cooperative MS nor the handover candidates, the cooperative group determiner 1606 determines to drop the cooperative MS.

For the function of dropping the cooperative MS in another exemplary embodiment, the controller 1604 operates as follows. When the comparison result of the channel quality of the cooperative MS and the first threshold is received from the BS via the communicator 1602, the cooperative group determiner 1606 determines whether it is necessary to drop the cooperative MS. The channel quality of the cooperative MS greater than the first threshold implies that the cooperative MS is close to the center of the cell of the serving BS. In this situation, the cooperative MS is not connectable to the neighbor BS. Hence, when the channel quality of the cooperative MS is greater than the first threshold, the cooperative group determiner 1606 determines to drop the cooperative MS.

When the cooperative group manager 1608 determines the setup information for the cooperative group, the controller 1604 transmits the cooperative transmission REQ message to the cooperative BSs via the communicator 1602. When the cooperative group determiner 1606 determines to drop the cooperative MS, the controller 1604 transmits the cooperative transmission drop-REQ message instructing to drop the cooperative MS from the cooperative group, to the serving BS of the cooperative MS via the communicator 1602.

Figure 17:
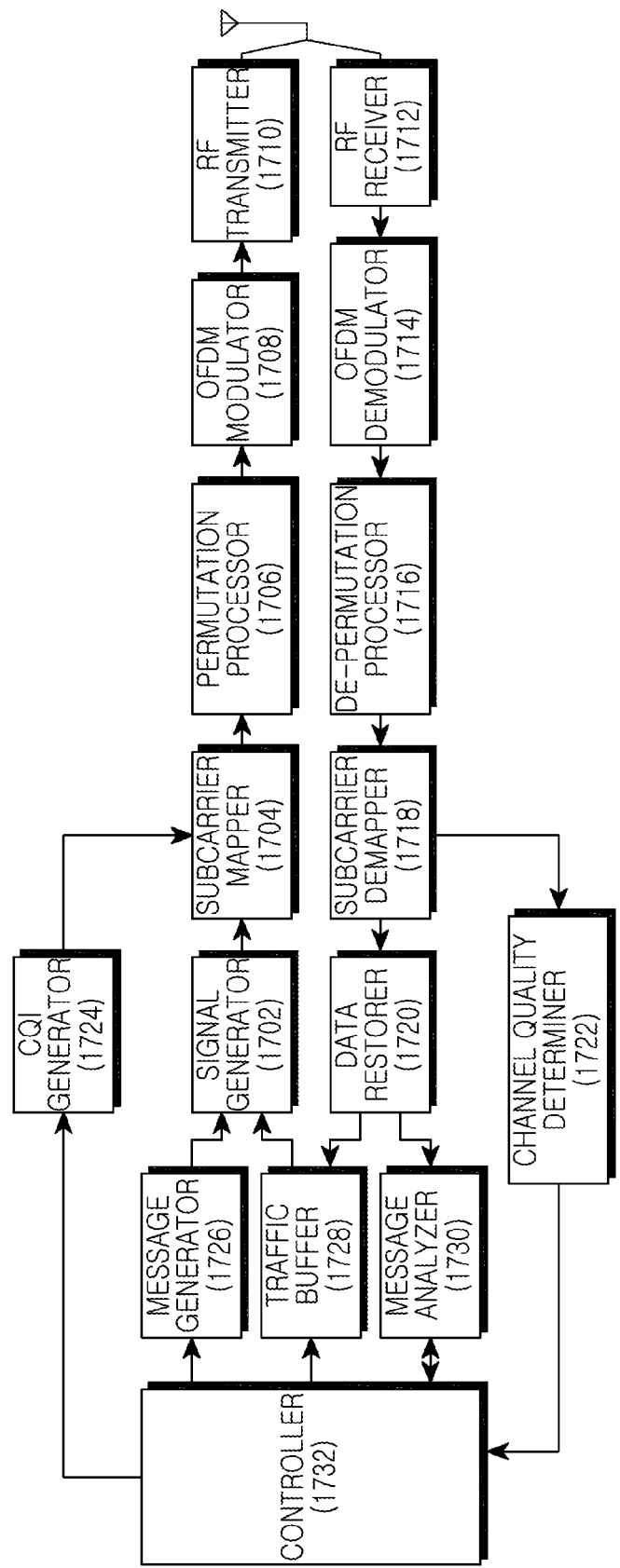
FIG. 17 is a block diagram of the mobile station in a broadband wireless communication system according to an exemplary embodiment of the present invention.

FIG. 17 is a block diagram of an MS in a broadband wireless communication system according to an exemplary embodiment of the present invention.

Referring to FIG. 17, the MS includes a signal generator 1702, a subcarrier mapper 1704, a permutation processor 1706, an OFDM modulator 1708, an RF transmitter 1710, an RF receiver 1712, an OFDM demodulator 1714, a de-permutation processor 1716, a subcarrier demapper 1718, a data restorer 1720, a channel quality determiner 1722, a CQI generator 1724, a message generator 1726, a traffic buffer 1728, a message analyzer 1730, and a controller 1732.

The signal generator 1702 channel-encodes the transmit bit stream, and modulates and converts the channel-encoded bit stream to complex symbols. The subcarrier mapper 1704 maps the complex symbols to the frequency domain. The permutation processor 1706 permutates the signals mapped to the frequency domain according to the defined permutation rule. The OFDM modulator 1708 converts the complex symbols mapped to the frequency domain to a time-domain signal using the IFFT process, and constitutes OFDM symbols by attaching the CP. The RF transmitter 1710 up-converts the baseband signal to an RF signal and transmits the RF signal over an antenna.

The RF receiver 1712 down-coverts an RF signal received over the antenna to a baseband signal. The OFDM demodulator 1714 divides the signal output from the RF receiver 1712 into OFDM symbols and restores the complex symbols mapped to the frequency domain using the FFT process. The de-permutation processor 1716 arranges the permutated signals according to the defined permutation rule. The subcarrier demapper 1718 classifies the complex symbols mapped to the frequency domain on the processing unit basis. The data restorer 1710 demodulates the complex symbols, and restores a data bit stream by channel-decoding the demodulated bit stream. Herein, the data bit stream includes the traffic and the message.

The channel quality determiner 1722 determines the channel quality with respect to the serving BS and the neighbor BSs. For example, the channel quality determiner 1722 determines the channel quality using the preamble signal. The CQI generator 1724 generates the CQI fed back to the serving BS over the CQI channel. For instance, the signal sent in the CQI channel is one of the predefined codewords. After selecting the codeword corresponding to the determined channel quality of the serving BS, the CQI generator 1724 outputs the signal stream indicative of the codeword.

The message generator 1724 generates the control message sent to the serving BS. The traffic buffer 1728 temporarily stores traffic data sent and received to and from the serving BS, and outputs the stored traffic data under the control of the controller 1732. The message analyzer 1730 confirms the information contained in a control message received from the serving BS, and provides the information to the controller 1732. For example, the message analyzer 1730 confirms the information relating to the neighbor BSs contained in the MOB_NBR_ADV message, and confirms the resource allocation information contained in the MAP message.

The controller 1732 controls the functions of the MS. For instance, when the message analyzer 1730 confirms the MOB_NBR_ADV message, the controller 1732 controls the channel quality determiner 1722 to determine the channel quality of the neighbor BSs confirmed through the MOB_NBR_ADV message. The controller 1732 selects the handover candidates using the channel quality of the neighbor BSs determined by the channel quality determiner 1722, and controls the message generator 1726 to generate the MOB_MSHO-REQ message including the information of the handover candidates. The controller 1732 controls the channel quality determiner 1722 to determine the channel quality of the serving BS at regular intervals, and controls the CQI generator 1724 to generate the CQI indicating the channel quality of the serving BS. More particularly, when the message analyzer 1730 confirms the MAP message for the cooperative transmission, the controller 1732 communicates according to the cooperative transmission scheme. At this time, the permutation processor 1706 and the de-permutation processor 1716 process the signal according to the permutation rule defined by the variable that determines the permutation pattern contained in the MAP message for the cooperative transmission, and the subcarrier demapper 1704 maps the pilot signal according to the pilot pattern contained in the MAP message for the cooperative transmission.

By virtue of the specific method for the cooperative transmission in the broadband wireless communication system, the cooperative transmission can be accomplished and system throughput can be enhanced.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An operating method of a Base Station (BS) in a wireless communication system, the method comprising:
   receiving a cooperative transmission REQuest (REQ) message that comprises at least one of information designating a cooperative Mobile Station (MS), a pilot pattern of the cooperative MS, a variable determining a permutation pattern, and an orthogonal code of the cooperative MS, from a control station;

allocating a resource of a predefined Coordinated MultiPoint transmit/receive (CoMP) zone occupying part of a frame, to at least one cooperative MS designated by the cooperative transmission REQ message; and communicating with the at least one cooperative MS according a cooperative transmission scheme using the resource of the CoMP zone, wherein the communicating according to the cooperative transmission scheme comprises:
 permutating a transmit signal of the CoMP zone according to a permutation rule defined by the variable determining the permutation pattern; and
 de-permutating a receive signal of the CoMP zone according to the permutation rule defined by the variable determining the permutation pattern.

2. The method of claim 1, further comprising:
transmitting a MAP message which comprises at least one of the pilot pattern of the cooperative MS, the variable determining the permutation pattern, and the orthogonal code of the cooperative MS, to the cooperative MS.

3. The method of claim 1, further comprising:
receiving weight matrix information for the cooperative transmission from the control station,
wherein the communicating according to the cooperative transmission scheme comprises:
 processing the transmit signal or the receive signal using a row or a column allocated to the BS in the weight matrix.

4. The method of claim 1, wherein the communicating comprises:
processing a signal in the CoMP zone using a channel matrix which comprises only channels having a channel quality greater than a threshold, among the at least one cooperative MS.

5. The method of claim 1, further comprising:
when receiving handover candidate information from an MS, providing the handover candidate information to the control station.

6. The method of claim 1, further comprising:
when a channel quality, which is received from a normal MS, between the normal MS and the BS is less than a first threshold, transmitting a neighbor BS list to the normal MS; and
when receiving per BS channel quality information of neighbor BSs of the neighbor BS list from the normal MS, providing the per BS channel quality information to the control station.

7. The method of claim 6, further comprising:
when receiving a channel quality between the cooperative MS and the BS from the cooperative MS, providing the control station with a comparison result of the channel quality received from the cooperative MS and the first threshold.

8. The method of claim 1, further comprising:
when receiving a cooperative transmission drop-REQ message designating a cooperative MS to drop from a cooperative group, from the control station, excluding the cooperative MS indicated by the cooperative transmission drop-REQ message from the cooperative group.

9. An operating method of a control station for controlling a cooperative transmission in a wireless communication system, the method comprising:
determining cooperative Base Stations (BSs) and at least one cooperative Mobile Station (MS) for the cooperative transmission using handover related information of an MS received from a BS or per BS channel quality information of the MS;
determining at least one of a pilot pattern of a cooperative MS, a variable determining a permutation pattern, and an orthogonal code of the cooperative MS, as a setup variable for the cooperative transmission; and
transmitting a cooperative transmission REQuest (REQ) message comprising at least one of information designating the cooperative MS, the pilot pattern of the cooperative MS, the variable determining the permutation pattern, and the orthogonal code of the cooperative MS, to the cooperative BSs.

10. The method of claim 9, wherein the determining of the cooperative BSs and the at least one MS for the cooperative transmission using the handover related information of the MS comprises:
determining the MS as the cooperative MS; and
determining a serving BS of the MS and at least one handover candidate of the MS as the cooperative BSs.

11. The method of claim 10, further comprising:
when at least one of the cooperative BSs of a cooperative group to which the cooperative MS belongs is neither the serving BS of the cooperative MS nor the handover candidates of the cooperative MS, determining to drop the cooperative MS; and
transmitting a cooperative transmission drop-REQ message instructing to drop the cooperative MS.

12. The method of claim 9, wherein the determining of the cooperative BSs and the at least one MS for the cooperative transmission using the per BS channel quality information of the MS comprises:
determining the MS as the cooperative MS; and
determining a serving BS of the MS and at least one neighbor BS having the channel quality of the MS greater than a second threshold, as the cooperative BSs.

13. The method of claim 12, further comprising:
when the channel quality between the cooperative MS and the serving BS of the cooperative MS exceeds the first threshold, determining to drop the cooperative MS; and
transmitting a cooperative transmission drop-REQ message instructing to drop the cooperative MS.

14. An operating method of a Mobile Station (MS) in a wireless communication system, the method comprising:
when receiving a normal MAP message, communicating with a serving Base Station (BS); and
when receiving a MAP message for a cooperative transmission, the message comprising at least one of a pilot pattern of a cooperative MS, a variable determining a permutation pattern, and an orthogonal code of the cooperative MS, communicating with cooperative BSs according to a cooperative transmission scheme using resources in a predefined Coordinated MultiPoint transmit/receive (CoMP) zone occupying part of a frame,
wherein the communicating according to the cooperative transmission scheme comprises:
 permutating a transmit signal of the CoMP zone according to a permutation rule defined by the variable determining the permutation pattern; and
 de-permutating a receive signal of the CoMP zone according to the permutation rule defined by the variable determining the permutation pattern.

15. An apparatus of a Base Station (BS) in a wireless communication system, the apparatus comprising:
a communicator for receiving a cooperative transmission REQuest (REQ) message that comprises at least one of information designating a cooperative Mobile Station (MS), a pilot pattern of the cooperative MS, a variable determining a permutation pattern, and an orthogonal code of the cooperative MS, from a control station;

a controller for allocating a resource of a predefined Coordinated MultiPoint transmit/receive (CoMP) zone occupying part of a frame, to at least one cooperative MS designated by the cooperative transmission REQ message, and for controlling to communicate with the at least one cooperative MS according a cooperative transmission scheme using the resource of the CoMP zone;

a permutation processor for permutating a transmit signal of the CoMP zone according to a permutation rule defined by the variable determining the permutation pattern; and a de-permutation processor for de-permutating a receive signal of the CoMP zone according to the permutation rule defined by the variable determining the permutation pattern.

16. The apparatus of claim 15, further comprising:
a message generator for generating a MAP message which comprises at least one of the pilot pattern of the cooperative MS, the variable determining the permutation pattern, and the orthogonal code of the cooperative MS.

17. The apparatus of claim 15, wherein the communicator receives weight matrix information for the cooperative transmission from the control station, further comprising:
a signal generator for processing a transmit signal using a row or a column allocated to the BS in the weight matrix; and
a data restorer for processing a receive signal using the row or the column allocated to the BS in the weight matrix.

18. The apparatus of claim 15, wherein the controller controls to process a signal in the CoMP zone using a channel matrix which comprises only channels having a channel quality greater than a threshold, among the at least one cooperative MS.

19. The apparatus of claim 15, wherein, when receiving handover candidate information from an MS, the controller provides the handover candidate information to the control station.

20. The apparatus of claim 15, wherein, when a channel quality, which is received from a normal MS, between the normal MS and the BS is less than a first threshold, the controller controls to transmit a neighbor BS list to the normal MS, and
when receiving per BS channel quality information of neighbor BSs of the neighbor BS list from the normal MS, the controller provides the per BS channel quality information to the control station.

21. The apparatus of claim 20, wherein, when a channel quality between the cooperative MS and the BS is received from the cooperative MS, the controller provides the control station with a comparison result of the channel quality received from the cooperative MS and the first threshold.

22. The apparatus of claim 15, wherein, when a cooperative transmission drop-REQ message designating a cooperative MS to drop in a cooperative group is received from the control station, the controller excludes the cooperative MS indicated by the cooperative transmission drop-REQ message from the cooperative group.

23. An apparatus of a control station for controlling a cooperative transmission in a wireless communication system, the apparatus comprising:

a determiner for determining cooperative Base Stations (BSs) and at least one cooperative Mobile Station (MS) for the cooperative transmission using handover related information of an MS received from a BS or per BS channel quality information of the MS;

a manager for determining at least one of a pilot pattern of a cooperative MS, a variable determining a permutation pattern, and an orthogonal code of the cooperative MS, as a setup variable for the cooperative transmission; and a communicator for transmitting a cooperative transmission REQuest (REQ) message comprising at least one of information designating the cooperative MS, the pilot pattern of the cooperative MS, the variable determining the permutation pattern, and the orthogonal code of the cooperative MS, to the cooperative BSs.

24. The apparatus of claim 23, wherein the determiner determines an MS providing the handover related information as the cooperative MS, and determines a serving BS of the MS and at least one handover candidate of the MS as the cooperative BSs.

25. The apparatus of claim 24, when at least one of the cooperative BSs of a cooperative group to which the cooperative MS belongs is neither the serving BS of the cooperative MS nor the handover candidates of the cooperative MS, the determiner determines to drop the cooperative MS, and
the communicator transmits a cooperative transmission drop-REQ message instructing to drop the cooperative MS.

26. The apparatus of claim 23, wherein the determiner determines an MS providing the per BS channel quality information as the cooperative MS, and determines a serving BS of the MS and at least one neighbor BS having the channel quality of the MS greater than a second threshold, as the cooperative BSs.

27. The apparatus of claim 26, wherein, when the channel quality between the cooperative MS and the serving BS of the cooperative MS exceeds the first threshold, the determiner determines to drop the cooperative MS, and
the communicator transmits a cooperative transmission drop-REQ message instructing to drop the cooperative MS.

28. An apparatus of a Mobile Station (MS) in a wireless communication system, the apparatus comprising:
a controller for communicating with a serving Base Station (BS) when receiving a normal MAP message, and when receiving a MAP message for a cooperative transmission, the message comprising at least one of a pilot pattern of a cooperative MS, a variable determining a permutation pattern, and an orthogonal code of the cooperative MS, and for controlling to communicate with cooperative BSs according to a cooperative transmission scheme using resources in a predefined Coordinated MultiPoint transmit/receive (CoMP) zone occupying part of a frame;
a permutation processor for permutating a transmit signal of the CoMP zone according to a permutation rule defined by the variable determining the permutation pattern; and
a de-permutation processor for de-permutating a receive signal of the CoMP zone according to the permutation rule defined by the variable determining the permutation pattern.

* * * * *